United States Patent [19]
Golden

[11] Patent Number: 5,906,417
[45] Date of Patent: May 25, 1999

[54] BIDIRECTIONAL SIDE DUMP TRAILER WITH PIN AND SLEEVE PIVOTABLE SUPPORT CONNECTORS

[76] Inventor: Randy Golden, 15 S. 14th St., Council Bluffs, Iowa 51501

[21] Appl. No.: 08/874,212

[22] Filed: Jun. 13, 1997

[51] Int. Cl.[6] .................................................. B60P 1/16
[52] U.S. Cl. ......................... 298/17.6; 298/17.7; 298/18; 296/184; 414/470
[58] Field of Search ................... 298/17.6, 17.7, 298/18; 296/184; 105/409; 414/470

[56] References Cited

U.S. PATENT DOCUMENTS

| | | | |
|---|---|---|---|
| 4,200,334 | 4/1980 | Lindholm | 298/18 |
| 4,242,031 | 12/1980 | McMullen | 298/18 |
| 4,494,798 | 1/1985 | Bailey | 298/18 |
| 4,619,484 | 10/1986 | Maxey | 298/18 |
| 5,480,214 | 1/1996 | Rogers | 298/18 |
| 5,597,211 | 1/1997 | Golden | 298/18 |

FOREIGN PATENT DOCUMENTS

| | | | |
|---|---|---|---|
| 1000763 | 11/1976 | Canada | 298/18 |
| 8902838 | 4/1989 | WIPO | 298/18 |

*Primary Examiner*—Dean Kramer
*Assistant Examiner*—Douglas Hess
*Attorney, Agent, or Firm*—Adam H. Jacobs

[57] ABSTRACT

A bidirectional side dump trailer includes a wheeled frame having first and second forward and rearward tub supports mounted thereon, and an open-topped containment tub. First and second forward and rearward pivotable support connectors each include a generally horizontal pin rotatably mounted on the containment tub and a sleeve rotatably mounted on the pin, while the first and second forward and rearward tub supports each include a generally concave saddle portion adapted to receive a respective one of the forward and rearward pivotable support connectors therein. The containment tub is pivotably mounted on the wheeled frame by releasable connection of each of the first and second forward pivotable support connectors to a respective one of the first and second forward tub supports, and releasable connection of each of the first and second rearward pivotable support connectors to a respective one of the first and second rearward tub supports, the pin and the sleeve of the first and second forward and rearward pivotable support connectors operating such that upon the sleeve being seated in one of the generally concave saddle portions, the sleeve remains in a generally non-rotating position while the pin rotates within the sleeve. Releasable locking devices releasably secure the pivotable support connectors to a respective one of the tub supports, and at least one power cylinder mounted at one end on the wheeled frame and the other to the containment tub lifts and tilts the tub to dump the contents of the tub.

14 Claims, 16 Drawing Sheets

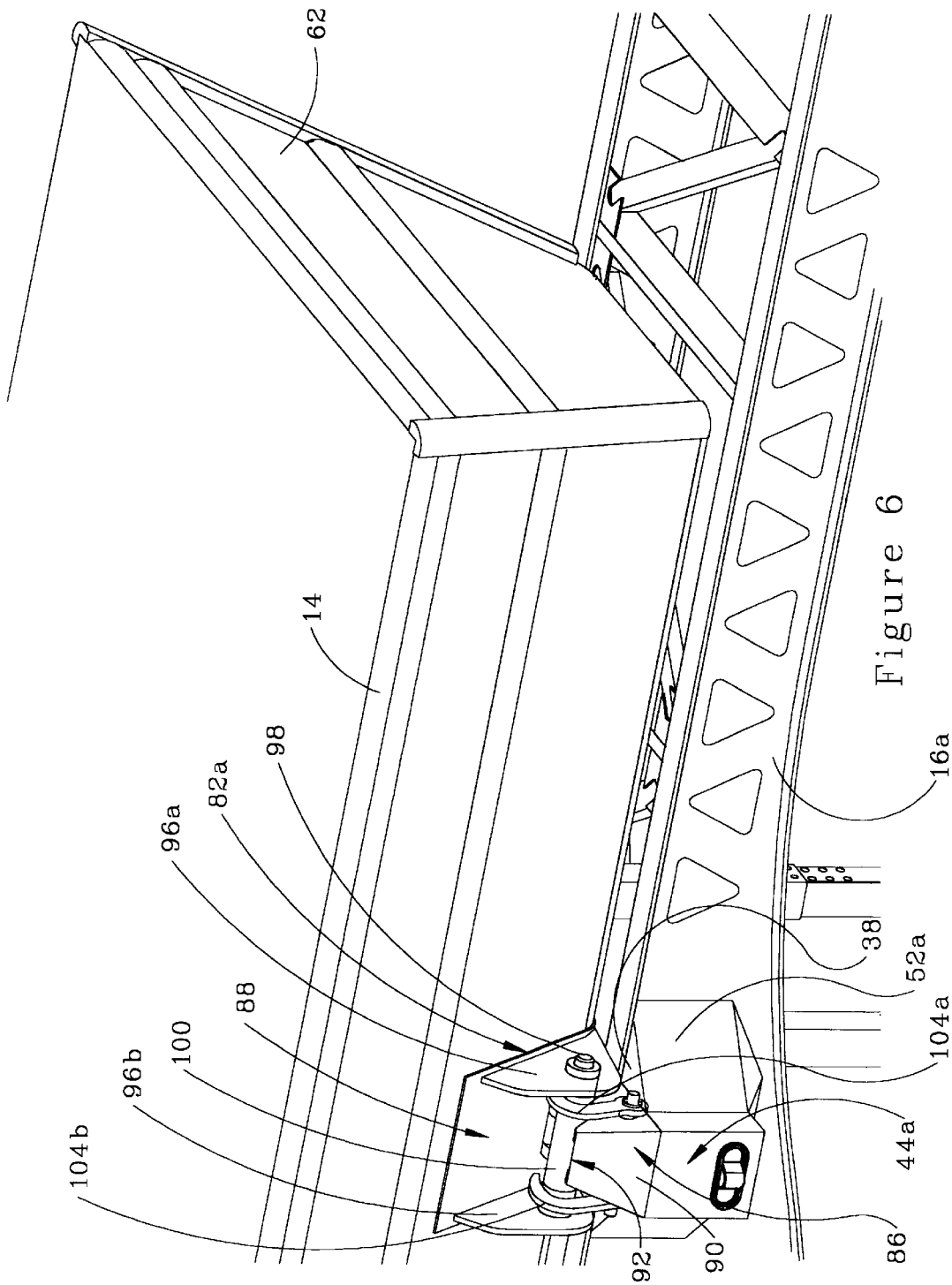

BIDIRECTIONAL SIDE DUMP TRAILER WITH PIN AND SLEEVE PIVOTABLE SUPPORT CONNECTORS

BACKGROUND OF THE INVENTION

1. Technical Field

This invention relates to solid material transport trailers and, more particularly, to a bidirectional side dump trailer which includes a wheeled frame on which is pivotally mounted a containment tub, the pivot axis for the tub being generally parallel with the longitudinal axis of the wheeled frame. The tub is releasably secured to the frame on opposite sides thereof to allow for rotation of the tub to be left or right of the frame. The pivotal support connectors which allow for rotation of the tub consist of a pin and sleeve combination, the sleeve rotatably mounted on the pin, the combination sitting in a saddle on the wheeled frame, the pin rotatably connected to the tub such that the sleeve, when seated in the saddle, remains in a fixed position while the pin rotates within the sleeve. Finally, a lifting device such as an hydraulic cylinder is mounted extending between the frame and the tub for rotating the tub about the pivotal support connectors for dumping of material within the tub.

2. Description of the Prior Art

Many different types of trailers have been proposed and used in the moving of rock, dirt, gravel, and other types of solid materials. These trailers included such designs as the commonly-used rear dump trailer which includes a trailer dump body and an opening end gate for releasing the solid materials contained within the body. The forward end of the body is elevated by a hydraulic cylinder or the like in order to dump materials from within the trailer body. Of course, the major disadvantage associated with such rear dump trailers is that the solid material, when dumped, may only be deposited directly behind the dumping trailer thus severely restricting the usefulness of the trailer for any other purpose.

For example, when road construction is being undertaken, it is often necessary to dump large loads of rock and gravel along the sides of the elevated roadbed to prevent erosion of the roadbed. For conventional rear dump trailers to perform this operation would be very difficult due to the need for the trailer to be backed up to the edge of the road bed, dumped and then driven forward once more. There is therefore a need for a trailer which can perform such dumping operations with greater economy.

To overcome the problems encountered with the use of rear dump trailers, one directional side dump trailers were constructed. These side dump trailers did allow solid materials to be dumped from the side of the trailer rather than through the rear of the trailer, but the side dump trailers of the prior art still included numerous disadvantages. For example, several of the side dump trailers in the prior art do not dump solid materials far enough away from the trailer to preclude interference of the solid materials with the transport of the trailer. Furthermore, as the side dump trailers of the prior art only dump to one side, for the operator of the trailer to dump on another side of the rear bed requires him or her to reverse the direction of the trailer. Finally, several of the unidirectional side dump trailers do not include locking mechanisms to secure the solid material containment body in a transport position.

Rogers, U.S. Pat. No. 5,480,214, discloses a side dump trailer which can dump materials from either side of the trailer. The Rogers trailer, however, includes several deficiencies. For example, although the Rogers trailer permits side dumping from either side of the trailer, the operator of the trailer must exit the cab of the towing vehicle to engage or release the J-shaped slides which, when engaged, permit the trailer body pivot to the left or the right of the trailer. This greatly decreases the efficiency with which the materials may be dumped by the Rogers trailer. Also, the Rogers trailer includes mounting pins which sit in saddles on the frame to permit rotation of the tub on the trailer. The pins and saddles frictionally engage one another while rotating, which causes wearing of the pins and saddles, thus mandating replacement or failure of the unit could occur. Finally, the length and shape of the tub of Rogers is impractical and inefficient, due to the long length of the tub (necessary to extend over the wheels), the center reinforcement structure in the tub which extends above the top walls of the tub and thus prevents use of the tub for carrying long cargo such as logs and such and the increased height of the end walls necessary to accommodate the long length of the power cylinders. There is therefore a need for an improved bidirectional side dump trailer which addresses and solves the deficiencies found in the Rogers trailer.

An object of the present invention is thus to provide an improved bidirectional side dump trailer.

Another object of the present invention is to provide a bidirectional side dump trailer which includes a wheeled frame on which is pivotally mounted a containment tub, the containment tub mounted such that it may be dumped to the left or right of the frame.

Another object of the present invention is to provide a bidirectional side dump trailer in which the containment tub is mounted on the frame by a pair of supports on each side of the containment tub such that the containment tub may pivot and dump materials a sufficient distance from the wheeled frame so as to not interfere with the operation of the trailer.

Another object of the present invention is to provide a bidirectional side dump trailer in which the releasable securement of the tub to the frame is capable of being remotely controlled so that an operator of the trailer may dump from either side of the trailer without having to exit the cab of the towing vehicle.

Another object of the present invention is to provide a bidirectional side dump trailer which includes a pin and sleeve combination for pivotably mounting the tub on the frame, the sleeve rotatably mounted on the pin, the combination sitting in a saddle on the wheeled frame, the tub being rotatably connected to the pin such that the sleeve, when seated in the saddle, remains in a fixed position while the pin rotates within the sleeve.

Finally, an object of the present invention is to provide a bidirectional side dump trailer which is less expensive to manufacture than those devices found in the prior art and is safe and efficient in use.

SUMMARY OF THE INVENTION

The present invention is directed to a bidirectional side dump trailer which includes a wheeled frame having a forward end, a rearward end and opposite sides and four tub supports mounted on upper surface of the wheeled frame, two supports being positioned forward on the frame and two supports being positioned rearward on the frame, thus forming a generally rectangular support base for the containment tub. The containment tub includes a base wall, at least two side walls, a front wall and a rear wall thereby defining an open-top containment tub. The tub also includes exterior and interior surfaces. Mounted on the containment tub on the exterior surface thereof are four pivotable support connectors which each include a generally horizontal pin rotatably mounted on the tub and a sleeve rotatably mounted thereon, the sleeve resting on a sleeve saddle mounted on the wheeled frame when the containment tub is mounted atop the wheeled frame. For securing the pivotable support connectors to the tub support, four releasable locking devices are mounted on the frame adjacent a respective one of the tub supports. The releasable locking devices act to secure the pivotable support connectors to the tub supports, and by releasing two locking devices on one side of the frame, the containment tub may be tilted and pivoted about the pivot axis formed by the secured pivotable support connectors on the opposite side of the frame.

For lifting the containment tub to a tilting position for dumping of the materials therein, a lifting system is mounted on the wheeled frame either beneath the containment tub or adjacent the tub. The lifting system would include one or more power cylinders. Finally, a selective engaging device is provided for selectively engaging the power cylinders whereby the containment tub is lifted to pivot about the pivotable support connectors on one side of the frame upon securement of the pivotable support connectors on the opposite of the frame to the tub support. The containment tub may be dumped in the opposite direction by securement and release of the opposite pivotable support connectors.

It is clear that the present invention provides a substantial improvement over those devices of the prior art. The present invention may dump solid materials to either side of the wheeled frame without inhibiting the transport characteristics of the wheeled frame due to the outwardly dumping nature of the containment tub. Furthermore, the pin and sleeve combination in which the sleeve rotates around the pin retards wear of the pivotable support connectors and allows the tub to be tilted much easier than with any system found in the prior art. Also, the releasable locking devices of the present invention may be engaged or disengaged remotely, thus allowing an operator of the trailer to dump from either side of the trailer without having to leave the safety of the cab of the trailer. Finally, the integral nature of the pivotable support connectors provides for longer life and a higher degree of safety for the bidirectional side dump trailer of the present invention. It is thus seen that the present invention provides a substantial improvement over the prior art.

BRIEF DESCRIPTION OF THE DRAWINGS

FIG. 6 is a partial detail perspective view of the front of the tub and the front set of tub mounts;

FIG. 10 is a perspective view of the alternative embodiment of the trailer;

FIG. 11 is a perspective view of the alternative embodiment of the trailer dumping its contents;

FIG. 12 is a side elevational view of the alternative embodiment of the trailer;

FIG. 13 is a top plan view of the alternative embodiment of the trailer without the tub mounted thereon to show the trailer construction;

FIG. 14 is a partial detail perspective view of the front of the alternative embodiment of the tub;

FIG. 15 is a perspective view of the tub by itself without the trailer; and

FIG. 16 is a top plan view of the tub.

DESCRIPTION OF THE PREFERRED EMBODIMENTS

Figure 1:
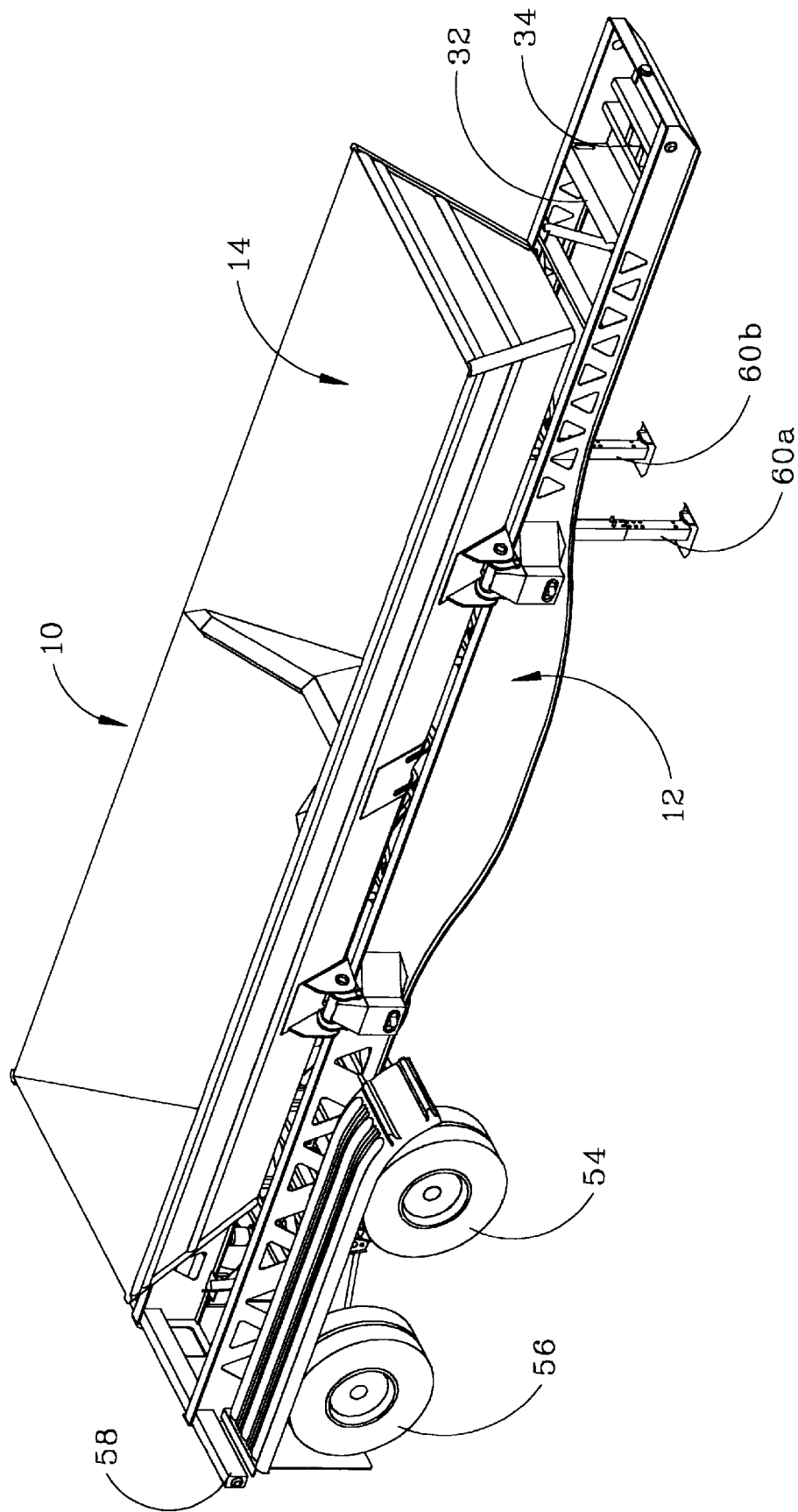
FIG. 1 is a perspective view of the trailer and tub of the present invention.
Figure 2:
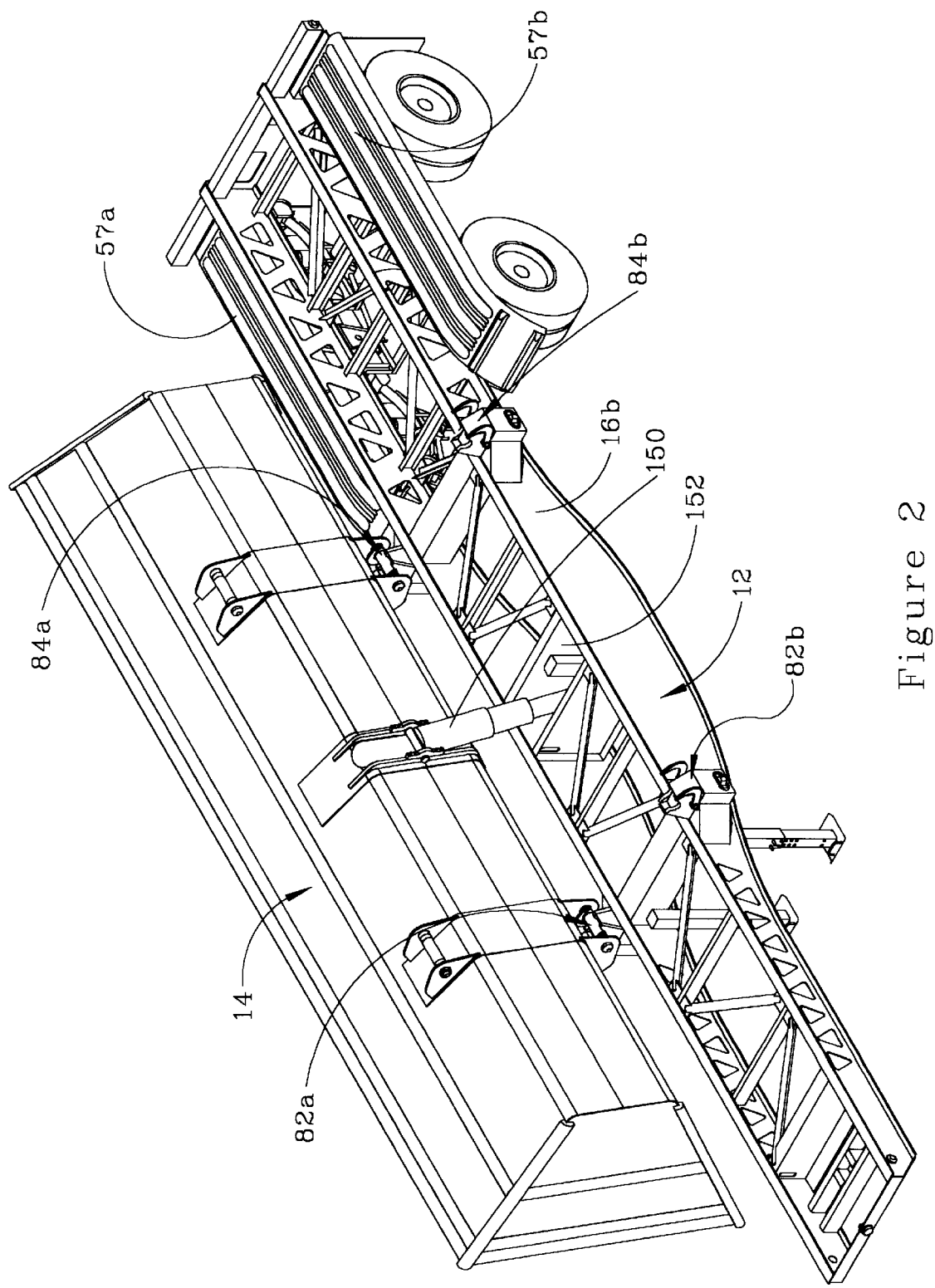
FIG. 2 is a perspective view of the trailer and tub, the tub being dumped.
Figure 3:
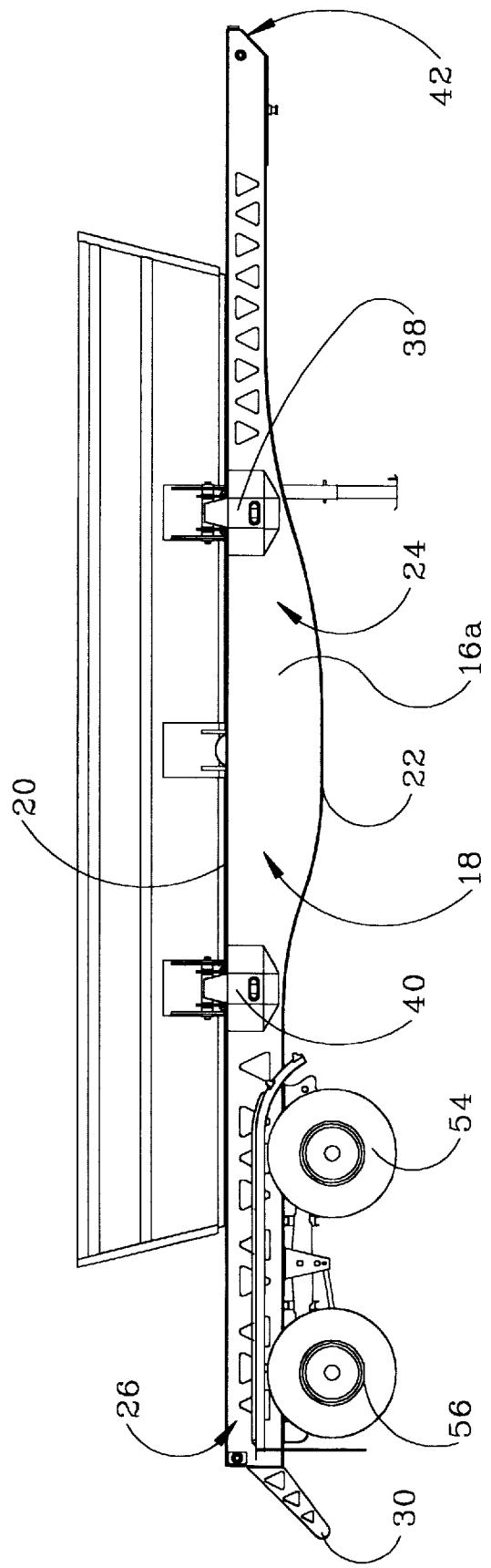
FIG. 3 is a side elevational view of the trailer and tub.
Figure 4:
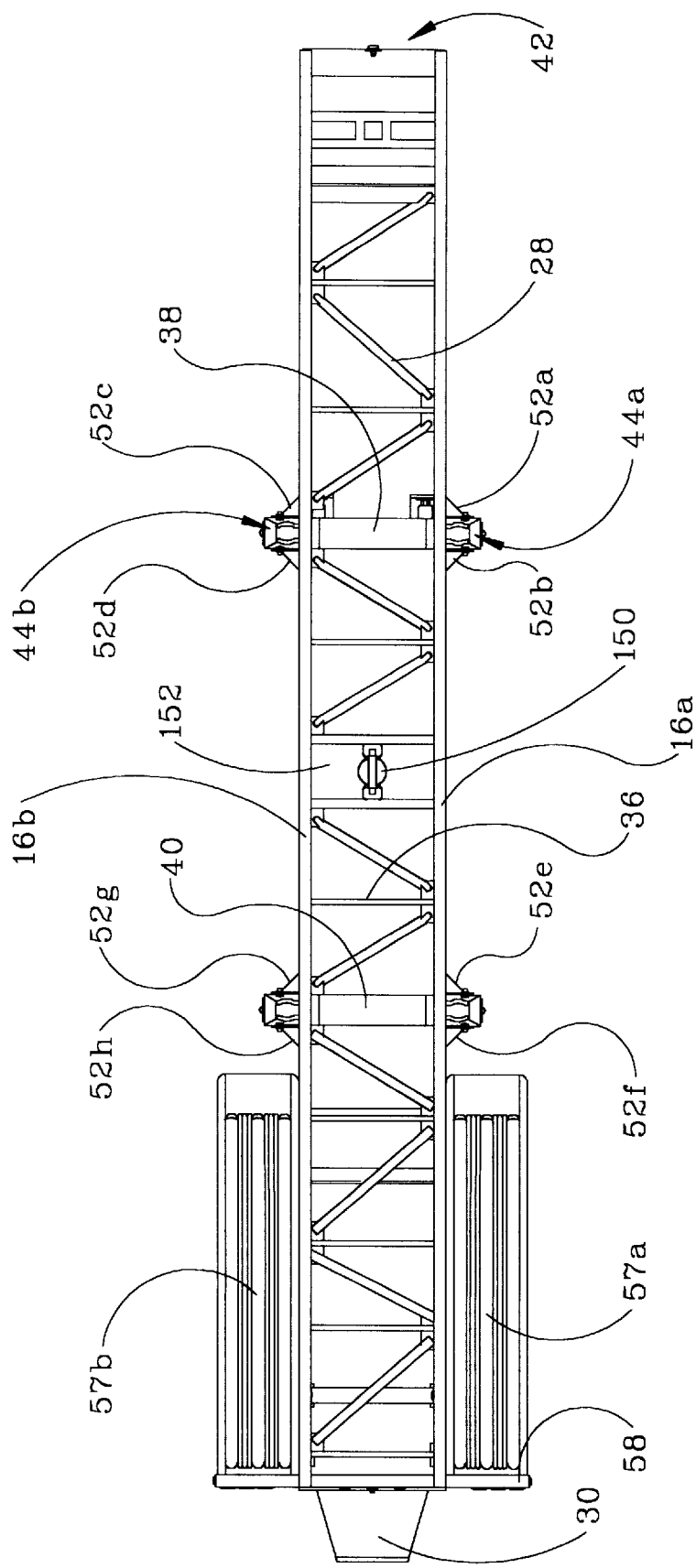
FIG. 4 is a partial top plan view of the trailer without the tub mounted thereon to show the trailer construction.

The bidirectional side dump trailer 10 of the present invention is best shown in FIGS. 1–4 as including a wheeled trailer 12 on which is pivotably mounted a containment tub 14. The wheeled frame 12, as shown in FIGS. 2, 3 and 4 includes two main frame support members 16a and 16b which extend the entire length of the frame 12. In the preferred embodiment, the overall length of the wheeled frame 12 is approximately 40 feet, with the distance between the main frame support members 16a and 16b being approximately 48 inches. It is preferred that each of the main frame support members 16a and 16b be constructed of high-tensile strength steel having a yield of approximately 175,000 and a Burnell rating of approximately 400. The main frame support members 16a and 16b are substantially identical to one another and therefore the following description of the main frame support members 16a should be understood to apply to main frame support member 16b as well.

The main frame support member 16a is preferably constructed having a generally I-beam type construction which includes a generally vertical web member 18, a top flange 20 and a lower flange 22. The main frame support member 16A is preferably constructed by adjoining two sections of the web 18, a forward section 24 and rearward section 26, the two sections connected to one another at a position approximately two-thirds of the overall length of the frame 12 rearwards from the front edge 42 of the frame 12. The web 18 is formed in two sections due to the frame shape requirements as best shown in FIG. 3 and would preferably have a thickness of ⅜" to ⅝". The forward section 24 of web 18 is generally straight and varies in height from approximately 12" adjacent the front edge 42 of frame 12 to approximately 24" at the midpoint of the frame 12, whereas the rearward section 26 of web 18 has a height of approximately 18". The forward and rearward sections 24 and 26 of web 18 would be joined with one another by welding or similar adjoining means. Obviously, the point at which the forward and rearward sections 24 and 26 of web 18 are joined could be a potentially weak area of the frame 12. The frame 12 of the present invention thus includes top and lower flanges 20 and 22 of the support member 16a which, in the preferred embodiment, are continuous metal strips extending the length of frame 12 which are welded to the top and bottom respectively of web 18 of main frame support members 16A. The top and lower flanges 20 and 22 are preferably constructed of flat steel having a width of approximately four inches and a thickness of approximately 3/16 inch to 5/8 inch, the use of flat steel permitting the top and lower flanges 20 and 22 to be bent and curved to conform to the contours of web 18, as shown best in FIG. 3. The continuous nature of the top and lower flanges 20 and 22 thus provide a solid structural base for the trailer 10. Of course, the web 18 may be constructed as an integral unit should the manufacturer of the invention find that such construction techniques would be appropriate.

Main frame support members 16a and 16b are securely connected to one another in spaced apart relation by a number of diagonal frame support struts 28, which, in the preferred embodiment, would be constructed of any appropriate shaped steel bar stock, such as C-channel, square tubing or I-beam construction. Of course, the support struts 28 may be arranged on the frame 12 in different ways than that shown in FIG. 4, and, in fact, may include a greater or fewer number of struts 28 than that shown, so long as the frame 12 is sufficiently rigid to support the containment tub 14. The two main frame support members 16a and 16b are also secured to one another at the rear end by a bumper 30 and at the forward end by a bulkhead 32 in front of which is mounted the trailer king pin plate and pin 34 which allows the trailer 10 to be secured to the towing vehicle in a cab and trailer combination. One or more spacer bars 36 may also extend between the main frame support members 16a and 16b to provide additional structural support for the frame 12.

Mounted on frame 12 are a forward tub support beam 38 and a rearward tub support beam 40, the forward tub support beam 38 spaced approximately one-third of the frame length from the forward end 42 of the frame 12 and the rearward tub support beam spaced approximately two-thirds the length of the frame 12 from the forward end 42 of the frame 12. In the preferred embodiment, forward tub support beam 38 and rearward tub support beam 40 are substantially identical in all respects including how they are seated on frame 12, and therefore the following description of forward tub support beam 38 shall be understood to apply to rearward tub support beam 40.

Forward tub support beam 38 is preferably constructed of steel tubing having a height of approximately 12 inches, a width of approximately 66 inches, and a wall thickness of approximately one-half inch. It is preferred that forward tub support beam 38 be mounted on main frame support members 16a and 16b within two generally square removed sections of main frame support member 16a and 16b, each removed section having the same general cross sectional shape as the forward tub support beam 38. As thus secured, forward tub support beam 38 extends between main frame support member 16a and 16b to provide further structural strength to the frame 12. As the frame 12 at forward tub support beam 38 is approximately 48 inches in width, approximately nine inches of the beam 38 extends outward past each side of the frame 12, as shown in FIGS. 1 and 3. These outer sections 44a and 44b of forward tub support beam 38 are best shown in FIGS. 4–7. As the outer sections of 44a and 44b are substantially identical, outer section 44a of forward tub support beam 38 will be described hereafter but is to be understood that the description shall apply equally to outer section 44b.

For securely mounting the forward and rearward tub support beams 38 and 40 to the main frame support members 16a and 16b, a plurality of diagonal beam support struts 52a–h are connected to extend outwards from a respective one of the main frame support members 16a and 16b to the outer ends of the forward and rearward tub support beams 38 and 40 as shown best in FIG. 4. It is preferred that the beam support struts 52a–h be securely welded to the main frame support members 16a and 16b and the forward and rearward tub support beams 38 and 40 to prevent deflection of the forward and rearward tub support beams 38 and 40 when the containment tub 14 is secured thereon. The beam support struts 52a–h are preferably constructed of any rigid steel strut shape, such as C-channel or angle steel.

Wheeled frame 12 would also include, in the preferred embodiment, wheel and axle assemblies 54 and 56 mounted on the rear end of wheeled frame 12, a light bar 58 for mounting of braking and turning lamps and one or more trailer feet 60a and 60b for supporting the forward end of the frame 12 when disconnected from a towing vehicle. Other commonly-used trailer features may be added or removed from the wheeled frame 12 as required by the needs of the trailer user.

Containment tub 14 is shown best in FIGS. 1, 2, 5, 8 and 9 as including forward and rearward walls 62 and 64, side walls 66a and 66b and a base wall 68. In the preferred embodiment, the containment tub 14 would have a top length of approximately 24 feet, a bottom length of approximately 22 feet, a top width of approximately 8 feet, a bottom width of approximately 2 feet 6 inches and a height of approximately 4 feet 6 inches, thus resulting in a volume of approximately 20 cubic yards. It is thus preferred that forward and rearward walls 62 and 64 of containment tub 14 have approximately the same generally trapezoidal shape and that the two side walls 66a and 66b of containment tub 14 each have approximately the same trapezoidal shape. It is preferred that the base wall 68 have a width of approximately 2 feet and a length of approximately 22 feet so that when the four walls 62, 64, 66a and 66b of containment tub 14 are mounted on the base wall 68 and connected to one another, the upwardly and outwardly divergent containment tub 14 of the present invention is formed. As an additional feature of the containment tub 14 of the preferred embodiment of the present invention, the connection of the base wall 68 to forward wall 62, rear wall 64, and side walls 66a and 66b may be accomplished by a series of curved joint sections each connecting the base wall 68 to a respective one of the forward wall 62, rearward wall 64 and side walls 66a and 66b. The curved connection of the walls 62, 64, 66a and 66b to base wall 68 would permit cleaner flow of particulate materials from the containment tub 14 when it is being dumped, thus increasing the efficiency of the dumping process. Of course, the joining of walls 62, 64, 66a and 66b to base wall 68 may be accomplished by any acceptable method such as welding or the like and may consist of standard hard angle joints. As was discussed previously in connection with frame 12, it is preferred that the containment tub 14 be constructed of high-tensile strength steel such as those known under the brand names "Formalloy" or "Hardox", which will result in a strong yet relatively light containment tub 14 being formed.

Figure 8:
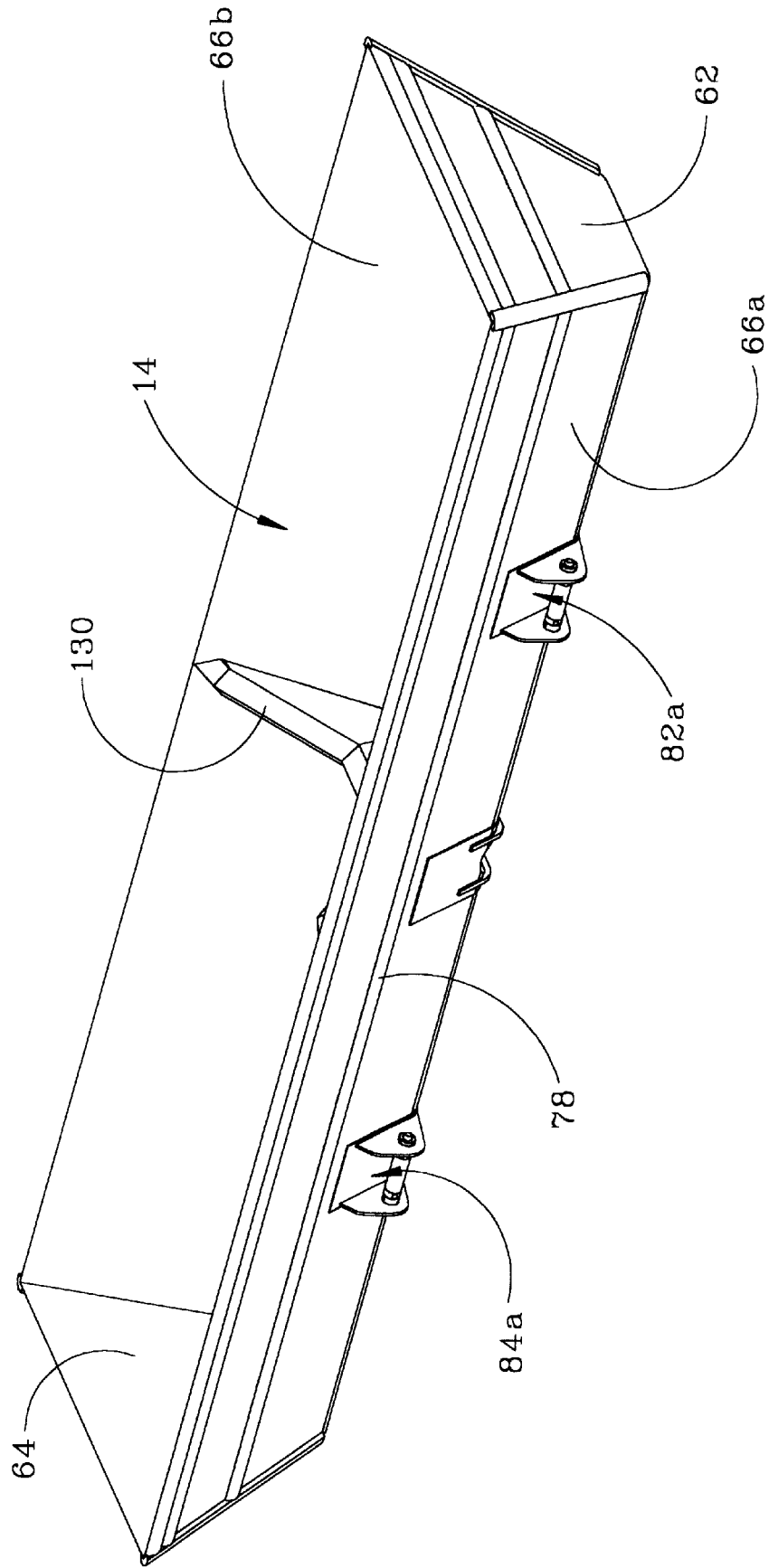
FIG. 8 is a perspective view of the tub by itself without the trailer.

To provide additional structural strength for tub 14 and further to permit the use of thinner steel for forward and rearward walls 62 and 64 and side walls 66a and 66b, a plurality of steel reinforcement bands 78 are welded onto the containment tub 14 as shown in FIG. 2 and FIG. 8. In the preferred embodiment, the reinforcement bands 78 would each be constructed of bar steel having a partial cylindrical cross-section and which, in the embodiment shown in FIG. 2, would have a thickness of 7 gauge, an arc radius of approximately 2 and 3/16 inches, and be curved in an arc of approximately 123 degrees. In the preferred embodiment, the reinforcement bands 78 extend completely around the outer circumference of containment tub 14 and are welded to containment tub 14 in the configuration shown in FIGS. 1, 2 and 8. The inclusion of reinforcement bands 78 has been determined to provide a significant increase in the structural strength of the containment tub 14.

Finally, at the corners of the reinforcement bands 78, a plurality of partial spherical corner sections can be provided to connect and secure the straight sections of the reinforcement bands to one another. Of course, it is to be understood that various types of reinforcement bands may be used for the present invention, so long as the substituted reinforcement bands fulfill the same strengthening functions as the reinforcement bands 78.

For mounting containment tub 14 on wheeled frame 12, forward pivotable support connectors 82a and 82b and rearward pivotable support connectors 84a and 84b are mounted on containment tub 14 as shown in FIGS. 1 and 4, 6, 7 and 7a. Each of the pivotable support connectors 82a, 82b, 84a and 84b is mounted on one of the sidewalls 66a and 66b of containment tub 14, with the tub support section of each of the pivotable support connectors 82a, 82b, 84a and 84b mounted on the forward and rearward tub support beams 38 and 40. Specifically, the rotatable portions of forward and rearward pivotable support connectors 82a and 84a are mounted on side wall 66a and the rotatable portions of forward and rearward pivotable support connectors 82b and 84b are mounted on side wall 66b. The tub support portions of forward pivotable support connectors 82a and 82b are mounted on forward tub support beam 38 and the tub support portions of rearward pivotable support connectors 84a and 84b are mounted on rearward tub support beam 40. Each of these pivotable connectors 82a, 82b, 84a and 84b are substantially identical to one another, and therefore the following description of forward pivotable support connector 82a should be understood to apply equally to the other pivotable support connectors 82b, 84a and 84b.

Figures 7, 7A:
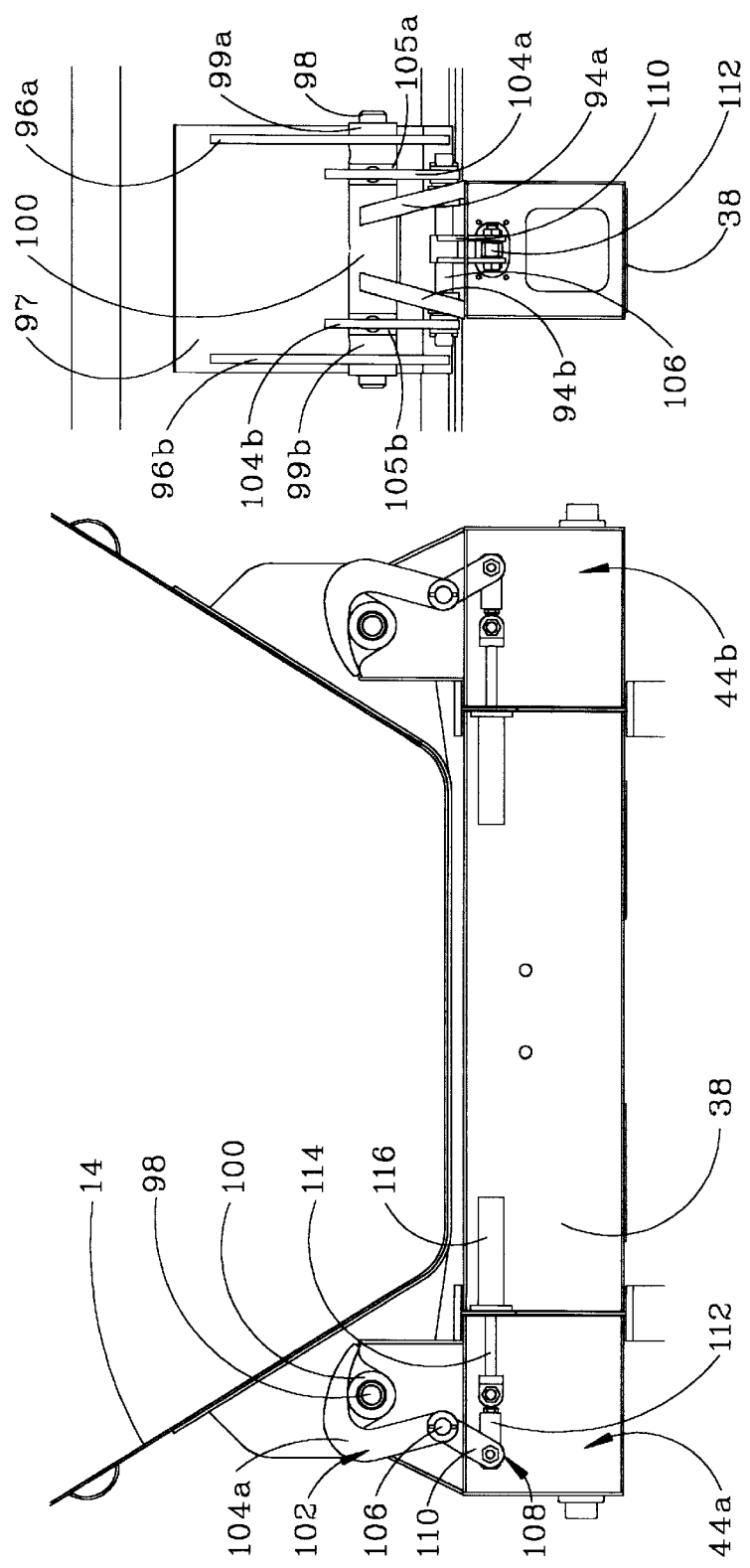
FIG. 7 is a detail partial end elevational view of forward tub support beam and the pin, sleeve and hook arrangement showing the internal details of the sleeve securement mechanism.
FIG. 7a is a partial detail side elevational view of the forward tub support beam showing further details of the pivotable support connector.

The tub support section of forward pivotable support connector 82a, in the preferred embodiment shown best in FIGS. 6, 7 and 7a, would include a tub support saddle section 86 mounted on the outer section 44a of forward tub support beam 38 and a tub-mounted rotatable pin section 88 which rests in the saddle section 86. Saddle section 86 of forward pivotal support connector 82a includes an upwardly extending, generally pyramidal-shaped metal saddle 90 which includes a topmost concave saddle portion 92.

FIG. 7a is a cutaway view of metal saddle 90 showing the two main sleeve support plates 94a and 94b which are mounted atop the outer section 44a of forward tub support beam 38 and are angled toward one another at the top portion thereof as shown best in FIG. 7a. It is preferred that main sleeve support plates 94a and 94b be angled towards one another to ensure that as the containment tub 14 is being returned to its seated position on the wheeled frame 12, the pin section 88 will fit directly onto the metal saddle 90 with main sleeve support plates 94a and 94b acting as "wedge guides" to seat the pin section 88 thereon. Of course, although the metal saddle 90 is shown as generally pyramidal-shaped, it is to be understood that numerous design shapes may be acceptable for use in the present invention so as long as the saddle function of the metal saddle 90 is maintained.

The tub-mounted rotatable pin section 88 of forward pivotal support connector 82a is best shown in FIGS. 6, 7 and 7a as including a pair of generally parallel upright pin support plates 96a and 96b which are generally triangular in shape. Each of the pin support plates 96a and 96b further includes a cylindrical bushing 99a and 99b having an internal diameter of approximately 2", each of which extend transversely through the pin support plates 96a and 96b. Extending between and threaded through the cylindrical bushings 99a and 99b on the pin support plates 96a and 96b is a tub support pin 98 which, in the preferred embodiment, would be an extremely sturdy metal pin having a length of approximately 18 inches and a diameter of approximately 1 and $^{15}/_{16}$". Because the diameter of the tub support pin 98 is smaller than the internal diameter of the cylindrical bushings 99a and 99b, pin 98 may thus rotate freely within the cylindrical bushings 99a and 99b. It is preferred that pin 98 be secured within the cylindrical bushings 99a and 99b by any appropriate means such as roll pins or snap rings which would be placed on the portions of the pin 98 outside of the pin support plates 96a and 96b. In the prior art, the pin 98 would then rest within the metal saddle 90 which would certainly result in substantial friction and wear thus causing metal fatigue and potential failure of the pivotable support connector 82a. To solve this problem, a sleeve 100 is freely rotatably mounted surrounding pin 98 as shown in FIGS. 7 and 7a. Sleeve 100 preferably would have an external diameter of approximately 3½" inches and an internal diameter of approximately 2". This will permit the pin 98 to rotate freely within the sleeve 100 and likewise allow sleeve 100 to freely rotate about pin 98 thus greatly reducing friction and wear caused by engagement of metal surfaces. With this construction, when sleeve 100 is seated within the concave saddle portion 92 of metal saddle 90, tub support pin 98 may freely rotate within sleeve 100 thus permitting containment tub 14 to be much more easily pivoted for dumping of material therein. As the sleeve 100 does not rotate relative to metal saddle 90, due to the weight of the tub on the sleeve 100, friction and wear are greatly reduced and the useable lifespan of the side dump trailer 10 may be extended.

For securing pin 98 and sleeve 100 within concave saddle portion 92 of metal saddle 90, a sleeve securement mechanism 102 is provided. In the preferred embodiment, the sleeve securement mechanism 102 is mounted within the forward tub support beam 38 and includes a pair of sleeve-engaging hooks 104a and 104b which are fixedly mounted on a pivotally mounted hook mount rod 106. Sleeve-engaging hooks 104a and 104b are designed such that when rotated into closed position as shown in FIG. 7, the upper flanges of sleeve-engaging hooks 104a and 104b extend over and secure sleeve 100 within concave saddle portion 92 of metal saddle 90. In fact, rotatably mounted on either side of sleeve 100 are two hook-engaging sleeve sections 105a and 105b which are free to rotate about pin 98. When the sleeve-engaging hooks 104a and 104b are in securement position, sleeve-engaging hooks 104a and 104b engage hook-engaging sleeve sections 105a and 105b and when the containment tub 14 is rotated, the hook-engaging sleeve sections 105a and 105b do not rotate relative to the sleeve-engaging hooks 104a and 104b thus providing a much more secure connection of the containment tub 14 to the wheeled frame 12.

When hook mount rod 106 is rotated counterclockwise, sleeve-engaging hooks 104a and 104b are rotated outwards from the wheeled frame 12 and thus permit sleeve 100 to be moved upwards away from concave saddle portion 92 of metal saddle 90 as would be required when the dumping process is initiated. To rotate the sleeve-engaging hooks 104a and 104b in that manner, a hook movement device 108 is operatively connected to the hook mount rod 106. The hook movement device 108, in the preferred embodiment, includes a downwardly depending bar 110 fixedly connected to the hook mount rod 106, bar 110 pivotally connected at the opposite end thereof to a linking rod 112 which in turn is pivotally connected to one end of a pneumatic piston 114. Pneumatic piston 114 may be extended or retracted from a pneumatic device 116. As shown in FIG. 7, pneumatic device has extended pneumatic rod 114 thus moving link 112 outwards and pivoting bar 110 such that hook mount rod 106 is rotated to bring sleeve-engaging hook 104*a* and 104*b* into retaining position, thus securing sleeve 100 within concave saddle portion 92 of metal saddle 90. When pneumatic rod 114 is retracted into pneumatic device 116, sleeve-engaging hooks 104*a* and 104*b* are pivoted outwards, thus disengaging from sleeve 100 and releasing sleeve 100 from the concave saddle portion 92 of metal saddle 90. It is preferred that sleeve-engaging hooks 104*a* and 104*b* be painted a bright color such as red or yellow to signify that the hooks are disengaged from the sleeve 100. This signification takes place due to the sleeve-engaging hooks 104*a* and 104*b* being pivoted outwards so that they may be seen down the length of the wheeled frame 12 by an operator of the side dump trailer 10. In this manner the operator of the side dump trailer 10 may visually confirm engagement or disengagement of the hooks and thus confirm which way the containment tub 14 will dump material.

Figure 5:
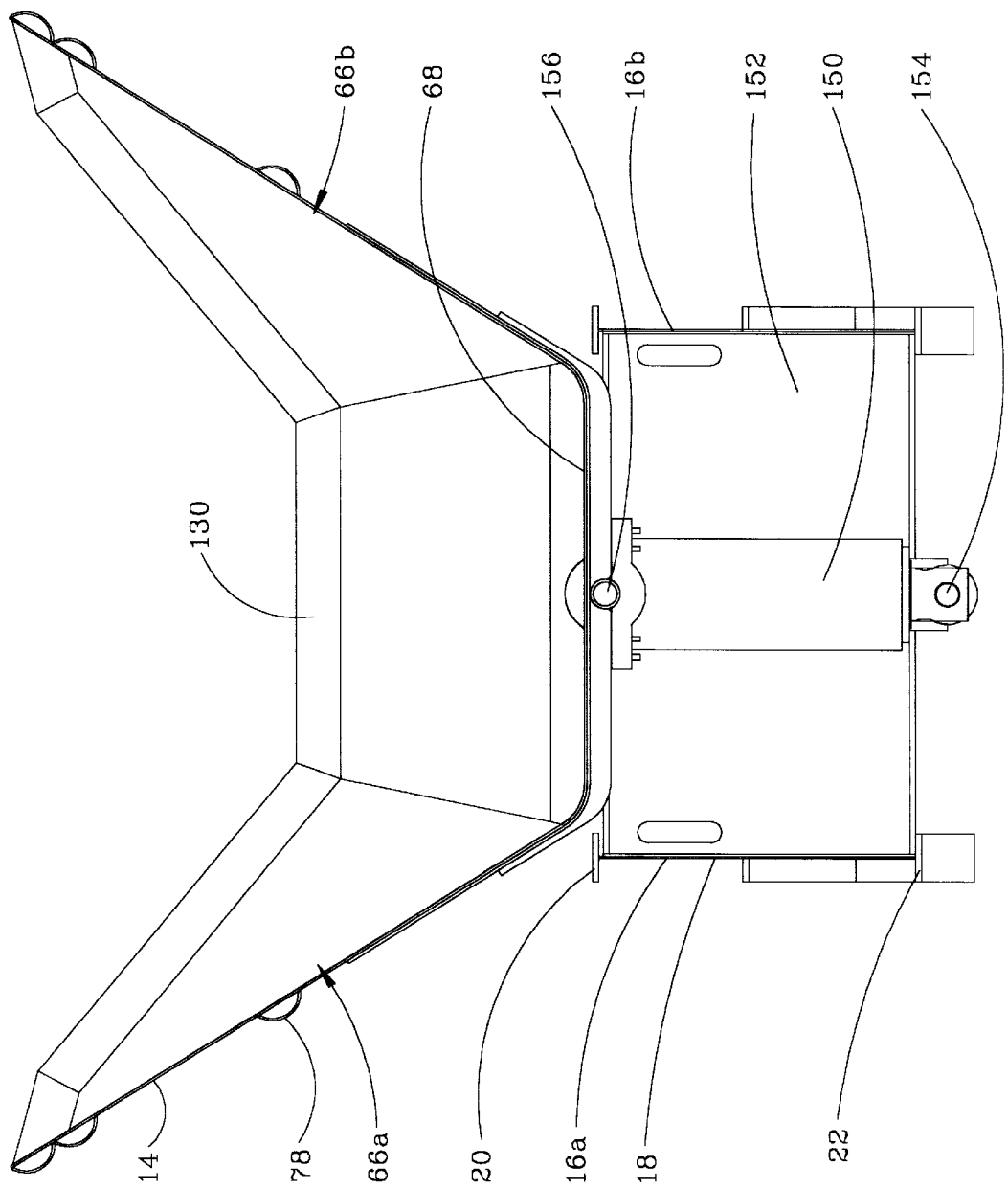
FIG. 5 is a partial front elevational view of the hydraulic cylinder tilt mechanism as it sits in the well mounted on the trailer frame.

For lifting and pivoting containment tub 14 over frame 12, a lifting system is mounted on frame 12 as shown best in FIGS. 4 and 5. In the preferred embodiment, the lifting system will be mounted within a lifting well 152 consisting of a steel box extending the width of frame 12 and having a rectangular base wall having a thickness of approximately ⅝ inches. The base wall may also be reinforced should such reinforcement be deemed necessary.

The lifting system preferably includes a power cylinder 150 pivotably mounted within lifting well 152 by a pin connector 154. Power cylinder 150 may thus pivot about an axis generally parallel with the longitudinal axis of the wheeled frame 12. The upper end of power cylinder 150 is pivotably connected to the underside of containment tub 14 by a similar pin connector 156 which allows power cylinder 150 to pivot about an axis generally parallel with the longitudinal axis of the wheeled frame 12. Power cylinder 150 would preferably be connected to any appropriate hydraulic fluid management system for controlling extension and retraction of the power cylinder 150, the controls for which may be mounted within the cab of the towing vehicle or on the trailer itself. The lifting operation of the tub 14 will be described in detail hereafter, however, FIG. 5 shows the power cylinder 150 in unextended position and FIG. 2 shows the power cylinder 150 in extended position.

Figure 9:
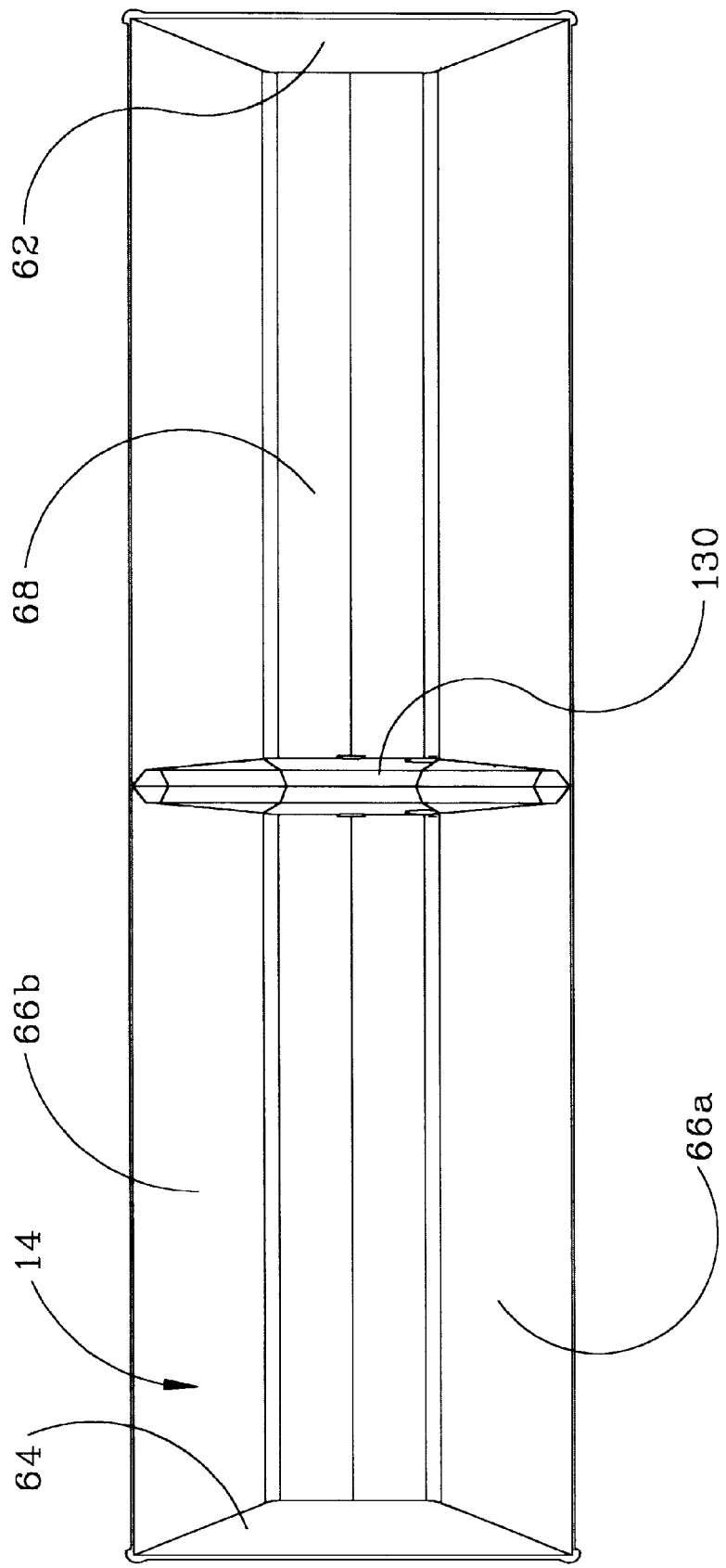
FIG. 9 is a top plan view of the tub.
Figure 10:
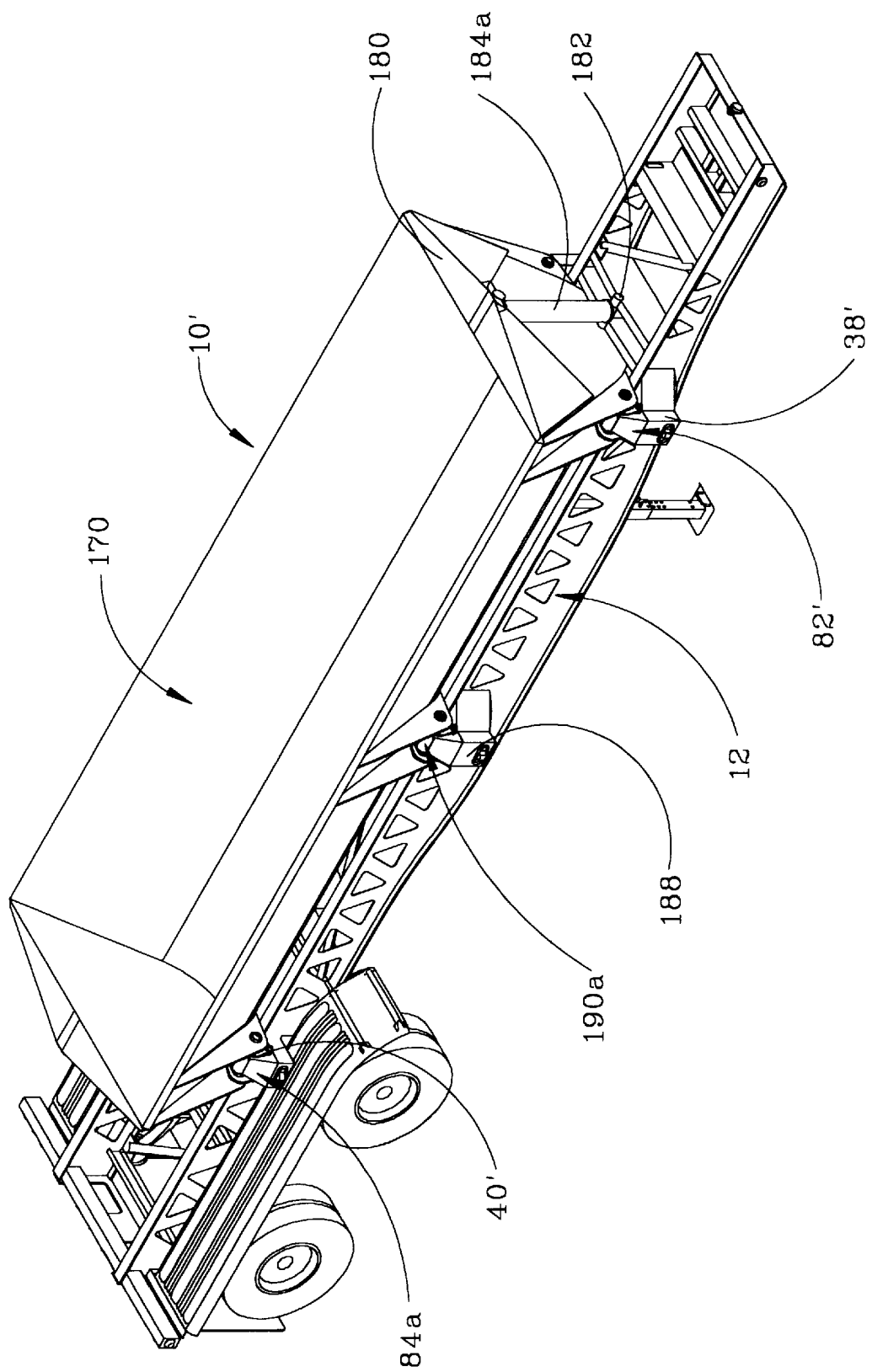
FIGS. 10–16 are directed to an alternative embodiment of the invention.

It is obvious that the stress on base wall 68 of containment tub 14 is extreme at the connection 156 of power cylinder 150 thereto. Therefore, for this reason and for further structural strength for the containment tub 14 it is important to provide a central tub reinforcement structure 130 mounted within tub 14 as shown in FIGS. 1, 5, and 9. It is preferred that central tub reinforcement structure 130 have a generally inverted V-shaped cross-sectional shape including front and rear walls angling upwards and inwards, mounted on base wall 68 and side walls 66*a* and 66*b* and connecting to one another to form the shape of reinforcement structure 130. An important feature of the reinforcement structure 130 is that the top of the inverted V-shape does not extend to the top of containment tub 14, but instead extends only one to two feet upwards from base wall 68. Therefore, the containment tub 14 of the present invention may carry long objects such as trees and other lawn debris, as opposed to those devices and trailers found in the prior art. The reinforcement structure 130 of the present invention thus is superior to those other types of reinforcement structures presently used.

The dumping operation of the trailer 10 of the present invention would be undertaken as follows: Upon reaching the location at which the material housed within the containment tub 14 is to be dumped, the operator would toggle the pneumatic activation switch associated with the left or right side of the trailer depending on the side on which the dump is to take place. The pneumatic activation switches are operatively connected to the pneumatic devices in the various forward and rearward pivotable support connectors 82*a*, 82*b*, 84*a* and 84*b* and command those devices to extend or retract as described below. For example, the operator, if wishing to dump off the right side of the trailer as defined by the forward movement of the trailer, would activate the toggle for the left side of the trailer thus disengaging the sleeve-engaging hooks 104*a* and 104*b* from the sleeve 100 by activation of the hook movement device 108, specifically the pneumatic device 116, retracting pneumatic rod 114 and thus pivoting hook mount rod 106 to pivot sleeve-engaging hooks 104*a* and 104*b* away from engagement of sleeve 100. Of course, it is to be understood that the numerical references to the features found in forward pivotable support connectors 82*a* apply with equal descriptiveness to the identical features found in forward pivotal support connector 82*b* and rearward pivotable support connectors 84*a* and 84*b*.

Once forward and rearward pivotable support connectors 82*b* and 84*b* are disengaged as described above, the containment tub 14 is ready to be dumped. Forward and rearward pivotable support connectors 82*a* and 84*a* would still be secured within their respective metal saddles, with their sleeves being fixedly mounted within the saddles allowing the tub-connected pins to rotate freely there within. The trailer operator would then engage power cylinder 150 within lifting well 152 via hydraulic controls housed either within the cab of the towing vehicle or mounted on the wheeled frame 12 of the side dump trailer 10. As shown in FIG. 2, as the power cylinder 150 extends, upper cylinder mount 156 and lower cylinder mount 154 permit the power cylinder 150 to pivot therewithin thus enabling the power cylinder 150 to perform its pistoning and lifting operation. As the power cylinder 150 extends, the containment tub 14 is tilted upwards and outwards about the pivot points supplied by the forward and rearward pivotable support connectors 82*a* and 84*a*, thus enabling the dumping of all material housed within the containment tub 14. It is expected that the power cylinder 150 will require a pressure exerted by the hydraulic system of approximately 2,500–3,000 P.S.I. which may be easily supplied by many commercially available hydraulic pump systems.

After the dumping operation has been completed, the power cylinder 150 is allowed to retract which reseats the containment tub 14 on the forward and rearward pivotable support connectors 82*a*, 82*b*, 84*a* and 84*b*. The angled nature of the main sleeve support plates 94*a* and 94*b* of the pivotal support connectors reseats the sleeve 100 within metal saddle 90 and concave saddle portion 92 quickly and easily regardless of the vibration or shaking of the containment tub 14 after the dumping of material held there within. Once the containment tub 14 is reseated on the forward and rearward pivotable support connectors 82*a*, 82*b*, 84*a* and 84*b*, the sleeve securement mechanism 102 for each pivotable support connectors 82*a*, 82*b*, 84*a* and 84*b* is re-engaged thus securing the containment tub 14 on wheeled frame 12.

Obviously, for a dump in the opposite direction, the above description would be equally valid, the only change being that forward and rearward pivotable support connectors 82*a* and 84*a* would be released and forward and rearward pivotable support connectors 82*b* and 84*b* would be secured in their respective secured locations.

While the trailer 10 of the present invention would most likely be connected by hydraulic lines to the hydraulic system of the towing vehicle for supplying fluid flow thereto, it is contemplated that a self-contained hydraulic fluid system could be housed within the well 152. Such a system would include a small but powerful diesel or gas engine connected to an hydraulic fluid pump. A fuel tank would be connected to the engine, and the pump would be placed in fluid flow connection with an hydraulic fluid tank and the fluid lines leading to the power cylinder 150. An operator would start the engine and the pump would force hydraulic fluid to the cylinders to extend them, thus lifting and tilting the containment tub 14 away from frame 12. Of course, the diesel engine could be replaced by any appropriate power device, such as an electric motor.

FIGS. 10–16 exhibit an alternative embodiment of the side dump trailer of the present invention. The side dump trailer 10' of FIGS. 10–16 includes many of the same features as were disclosed previously in connection with the side dump trailer 10 of FIGS. 1–9. Such common features include the wheeled trailer 12', forward tub support beam 38', rearward tub support beam 40', forward pivotal support connectors 82*a*', and 82*b*' and rearward pivotal support connectors 84*a*' and 84*b*'. Each of these features are substantially identical to the elements described previously in connection with the embodiment of FIGS. 1–9. The embodiment of FIGS. 10–16, however, incorporates substantial changes to the containment tub 170 which necessitates some modification of the support connector arrangement on the wheeled frame 12'.

Specifically, the containment tub as shown best in FIGS. 10, 11, 15, and 16 includes a forward wall 172, rearward wall 174, and side walls 176*a* and 176*b* which are similar to those described to those in connection with containment tub 14 of the embodiment shown in FIGS. 1–9. However, the base wall 178 of containment tub 170 is not flat but rather is arcuate in cross-section, as shown best in FIG. 15. Furthermore, the containment tub 170 is connected to the wheeled frame 12' by an additional set of center pivotal support connectors 190*a* and 190*b* which are mounted on a center tub support beam 188 mounted at approximately the mid-point of the containment tub 170 on the wheeled frame 12'. It is expected that center tub support beam 188 and center pivotal support connectors 190*a* and 190*b* will be substantially identical to the forward and rearward pivotal support connectors 82*a*', 82*b*', 84*a*' and 84*b*' and, therefore, further discussion regarding center pivotal support connectors 190*a* and 190*b* is not believed to be necessary.

The overriding purpose for the design changes in the embodiment of FIGS. 10–16, i.e. the center pivotal support connectors 190*a* and 190*b* and the rounded base wall 178 of containment tub 170, is to permit the tub 170 to be manufactured without requiring a center reinforcement structure such as that described in connection with the embodiment of FIGS. 1–9. The lack of a center reinforcement structure permits the containment tub 170 to carry items such as logs, tubes, I-beams and other such elongated articles within the tub which cannot be carried in the tubs found in the prior art. Moreover, due to the length (approximately 20 feet) of the containment tub 170, lengthy articles may be easily carried within the tub. It is believed that the combination of the center pivotal support connectors 190*a* and 190*b* and rounded base wall 178 will provide sufficient rigidity and structural strength for the containment tub 170 without requiring the center reinforcement structure.

Figure 11:
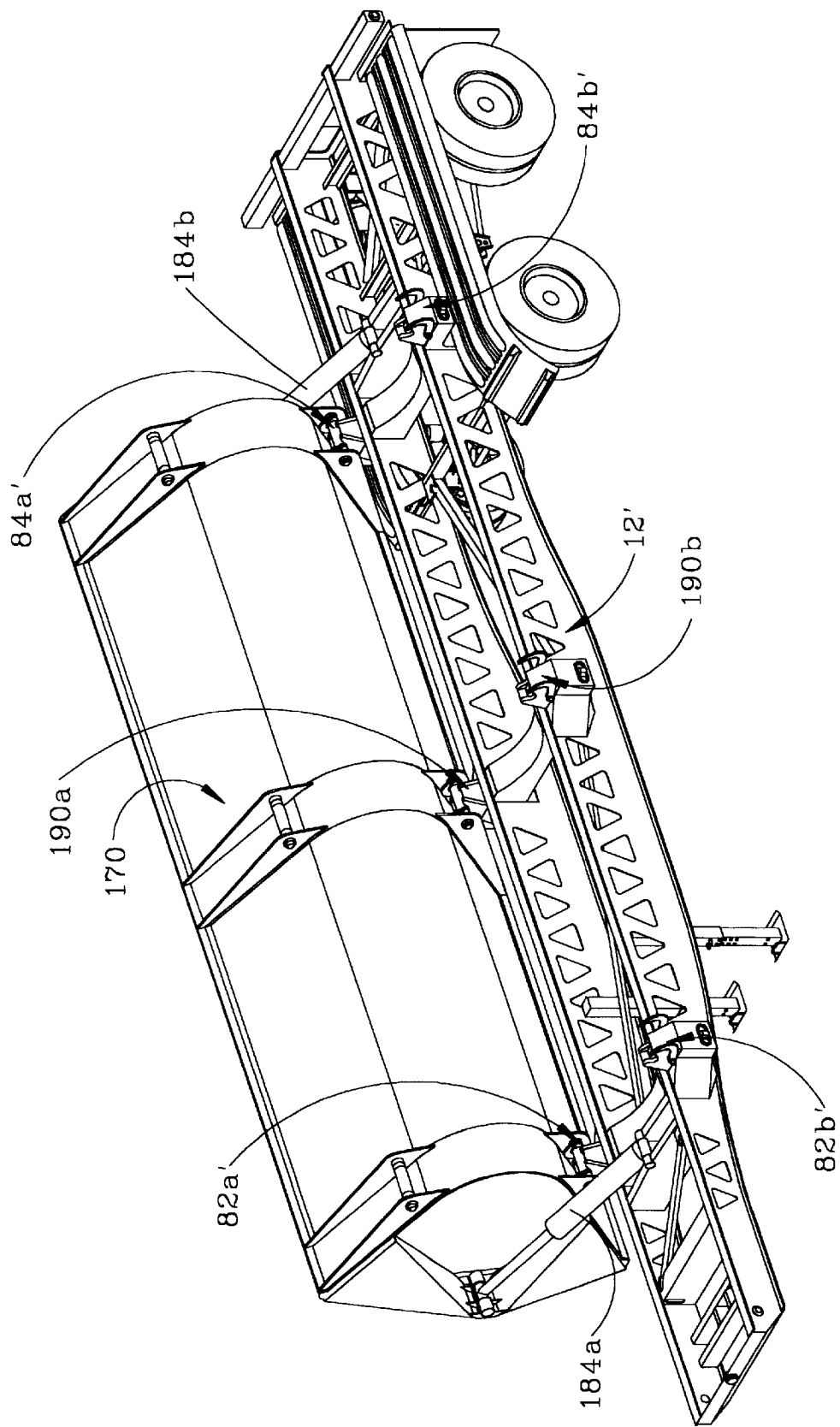
Figure 12:
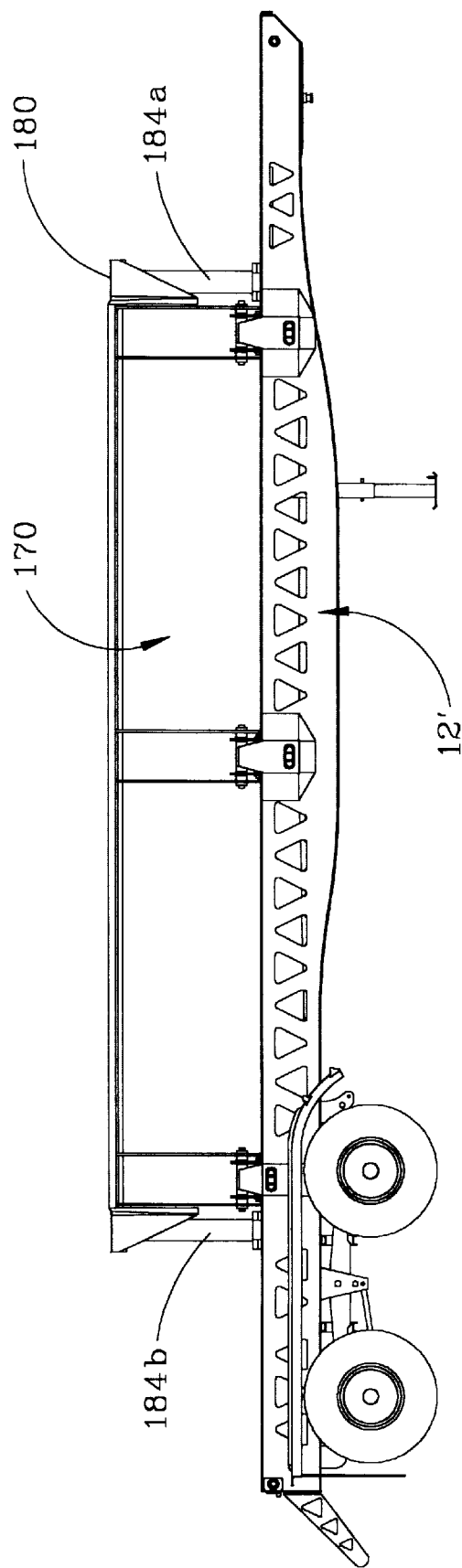
Figure 13:
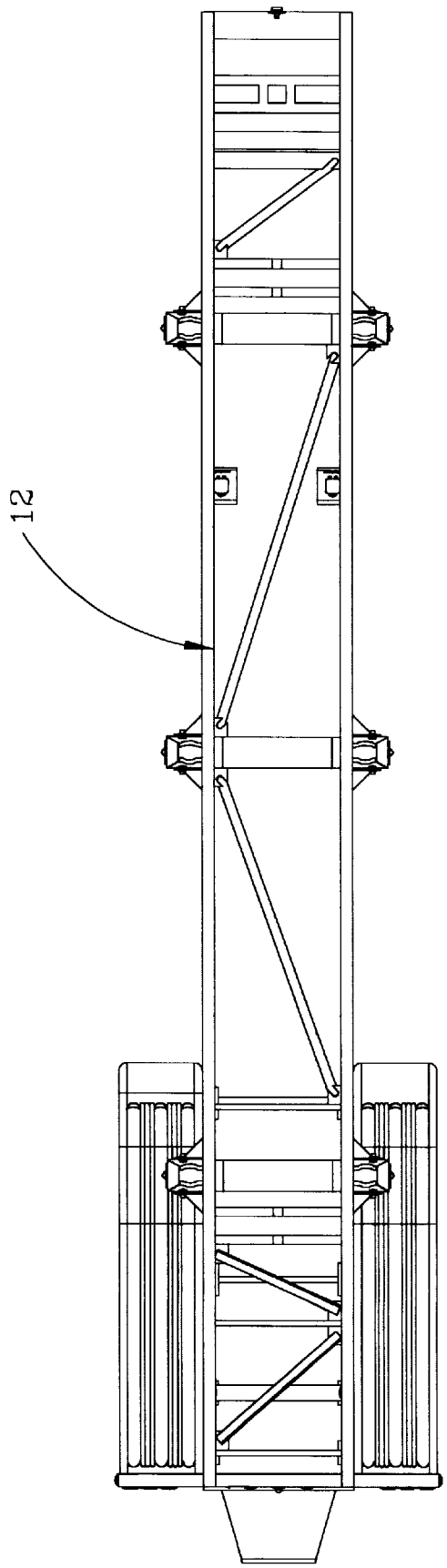

For tilting the containment tub 170 relative to the wheeled frame 12', front and rear power cylinders 184*a* and 184*b* are provided, front power cylinder 184*a* mounted adjacent the front end 172 of containment tub 170 and rear power cylinder 184*b* mounted adjacent the rear wall 174 of containment tub 170, as shown best in FIG. 11. The mounting arrangement for the front and rear power cylinders 184*a* and 184*b* are substantially identical and, therefore, the following description of the mounting arrangement for front power cylinder 184*a* should be understood to apply equally to the mounting arrangement for rear power cylinder 184*b*.

Figure 14:
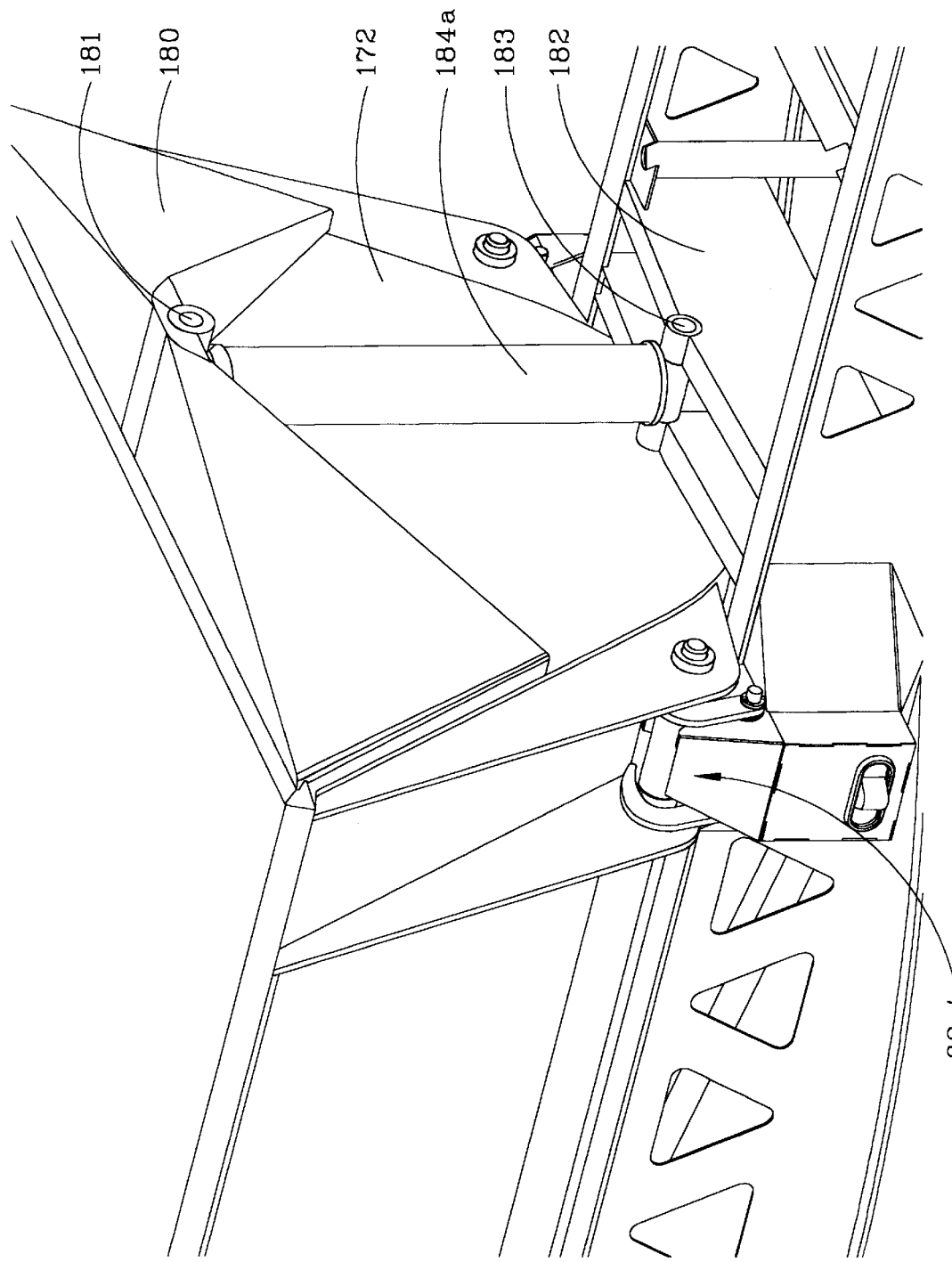
Figure 15:
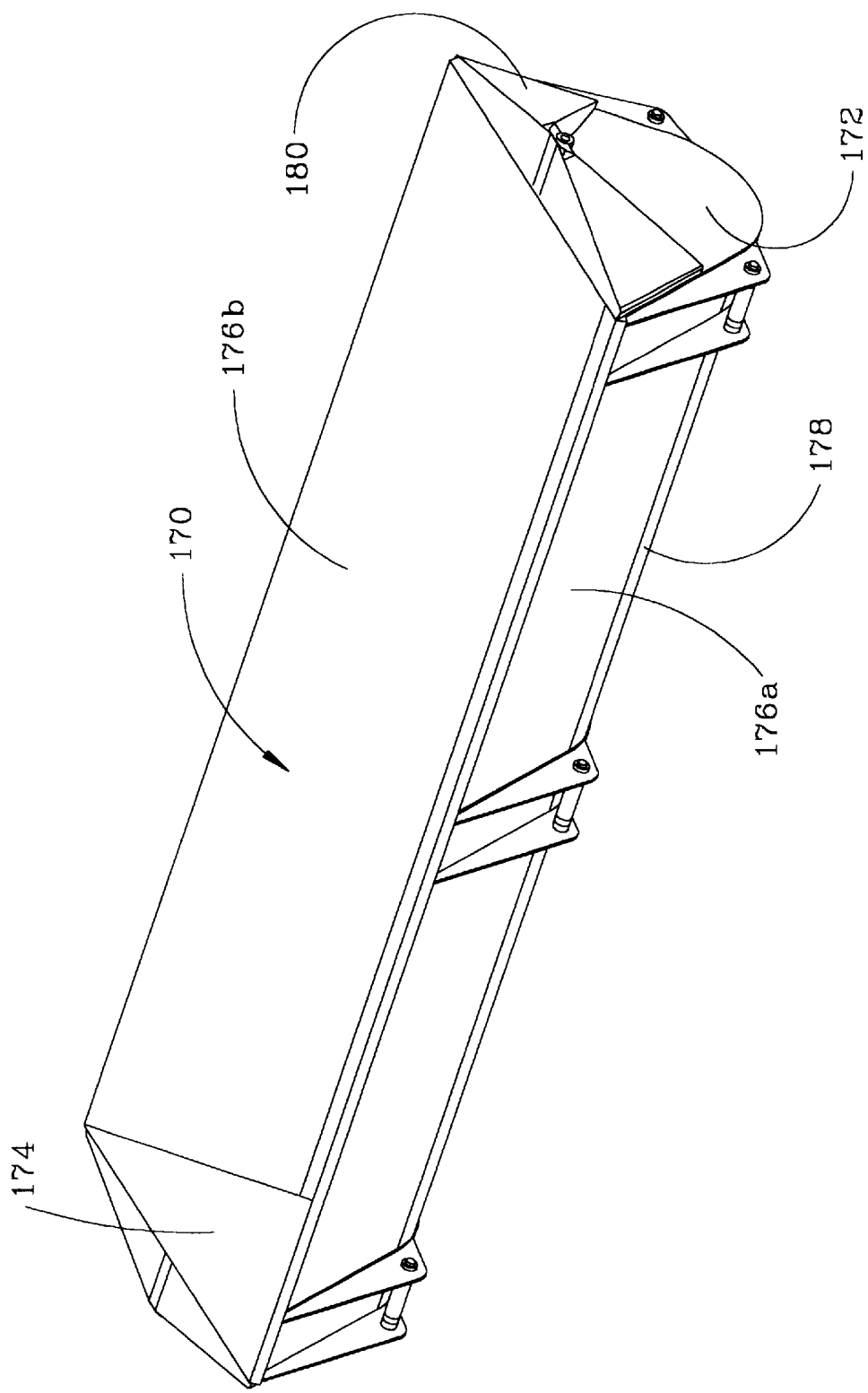
Figure 16:
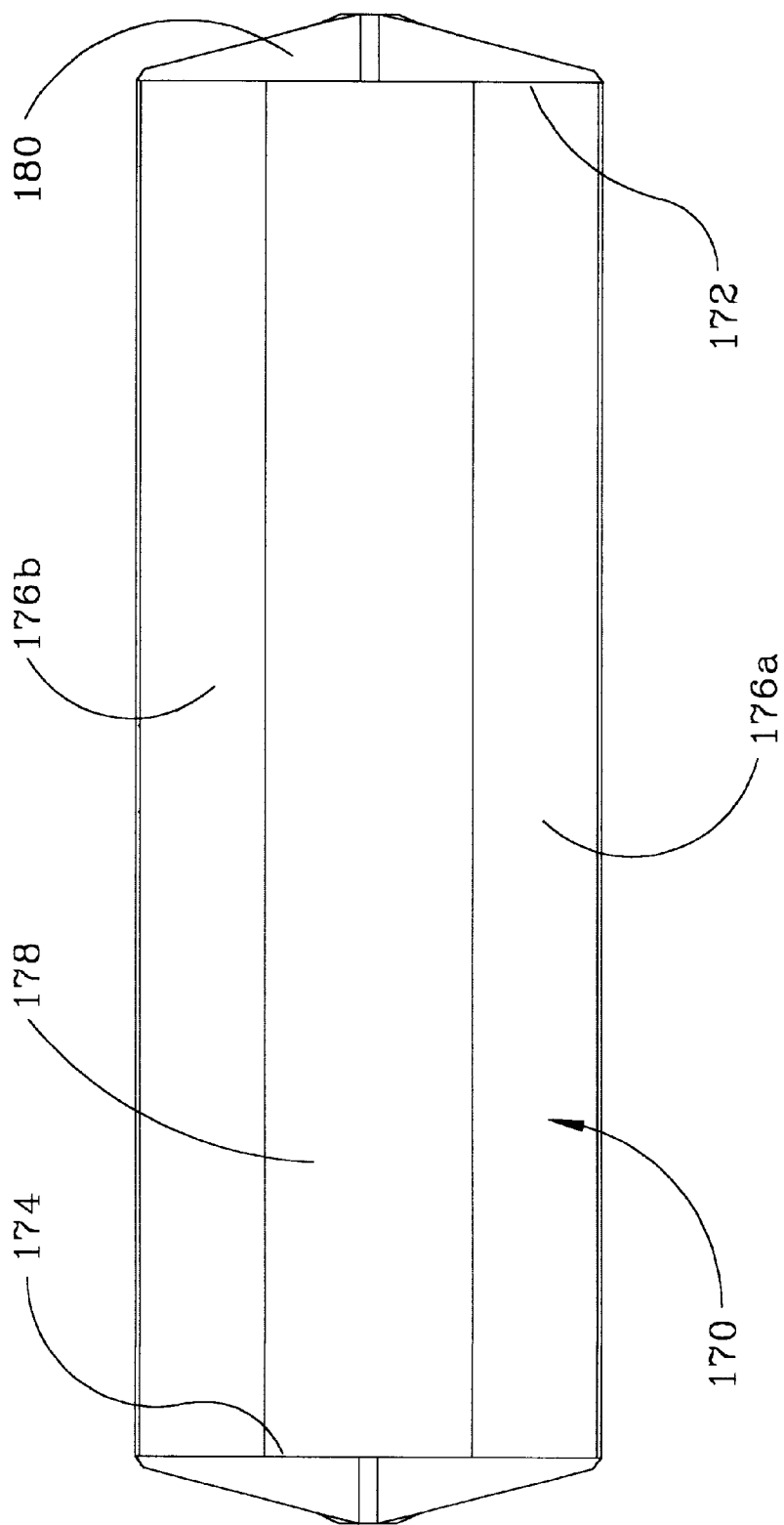

FIG. 14 best shows the mounting arrangement for front power cylinder 184*a* on wheeled frame 12'. Wheeled frame 12' includes a mounting structure 182 which, in the preferred embodiment, consists of two generally parallel spaced-apart I-beams each having a pinreceiving cylinder mounted on top thereof. When power cylinder 184*a* is mounted to wheeled frame 12', the lower end of the power cylinder commonly would include a mounting cylinder adapted to receive a pin there through. This mounting cylinder is aligned with the cylinders atop the mounting structures 182 and a pin 183 is slid therethrough and secured therewithin to permit the lower end of the front power cylinder 184*a* to pivot along an axis generally parallel with the longitudinal axis of the wheeled framed 12' as shown in FIG. 4. The forward wall 172 of the tub 170 preferably further includes a front reinforcement structure 180 which, in the preferred embodiment, includes reinforcement struts which transfer the force applied to the top of the reinforcement structure 180 to the side walls 176*a* and 176*b* and forward wall 172 of containment tub 170. Front reinforcement structure 180 would also include a pair of spaced apart cylinders similar to those described in connection with the cylinder frame mount 182 designed to accommodate the top cylinder of the front power cylinder 184*a*, thus permitting a pin 181 to be slid there through to secure the front power cylinder 184*a* to the front reinforcement structure 180. Of course, the front and rear power cylinders 184*a* and 184*b* would be connected to the appropriate hydraulic drive mechanism to engage and/or disengage the front and rear power cylinders 184*a* and 184*b*, such connections being well known in the art of hydraulics.

The dumping operation of the side dump trailer 10', shown in FIGS. 10–16, would be generally similarly to that described in connection with the dumping operation of side dump trailer 10 of FIGS. 1–9 with the notable exception being the engagement or disengagement of the appropriate center pivotal support connection 190*a* or 190*b* depending upon the direction in which the containment tub 170 is to be tilted. Also, the front and rear power cylinders 184*a* and 184*b* need to be driven at the same extension and retraction rate in order to prevent torque being applied to the containment tub 170 which may weaken the tub structure.

It is important to note that the length of the front and rear power cylinders 184*a* and 184*b* are short enough to permit the top edge of the containment tub 170 to be a uniform height along all four walls of the containment tub 170. This is important for both aesthetic and structural reasons, as the tub may be designed with much greater rigidity provided all walls extend to the same height. It is thus believed that the embodiment of FIGS. 10–16 provides substantial improvements over those designs found in the prior art.

The unique aspects of the present invention thus being set forth, it is clear that the present invention provides a substantial improvement over those trailers found in the prior art. As the trailer dumping operation can be completed without the operator of the trailer having to leave the cab of the towing vehicle, dumping operation efficiency is greatly increased, along with the safety of the operator. Furthermore, the non-intrusive nature of the central tub reinforcement structure 110 permits the carrying of debris and objects of extended lengths, a feature not found in those trailers of the prior art. Finally, due to the construction materials used and overall design of the trailer 10, the weight of the trailer is substantially reduced, thus permitting heavier loads to be carried within containment tub 14, as the gross vehicle weight restrictions imposed on roadway travel will not be exceeded.

It is to be understood that numerous modifications, substitutions and additions may be made to the trailer of the present invention which will still fall within the intended broad scope of the appended claims. For example, the sizes and dimensions given in the above description may be easily modified without affecting the functioning ability of the present invention. Furthermore, commonly understood modifications such as addition of the third axle and wheel combination or modification to "gooseneck" trailer configuration are contemplated. Alternatively, once the frame of the present invention is constructed, it may be mounted on any desired vehicle such as a dump truck or other such trailer unit, as the frame need not be an integral part of the transportation means. Finally, reorientation of the various features of the present invention can be undertaken without modifying the underlying functionality of the invention.

There has thus been shown and described a bidirectional side dump trailer which accomplishes all of the stated objectives.

I claim:

1. A bidirectional side dump trailer comprising:

a wheeled frame having a forward end, a rearward end and opposite sides;

first and second forward tub supports mounted on said wheeled frame adjacent said forward end of said wheeled frame, said first forward tub support adjacent one side of said wheeled frame and said second forward tub support adjacent the other side of said wheeled frame;

first and second rearward tub supports mounted on said wheeled frame adjacent said rearward end of said wheeled frame, said first rearward tub support adjacent one side of said wheeled frame and said second rearward tub support adjacent the other side of said wheeled frame;

a containment tub including a base wall, at least two side walls, a front wall and a rear wall thereby defining an open-topped containment tub having exterior and interior surfaces;

first and second forward pivotable support connectors mounted on said exterior surface of said containment tub adjacent said front wall;

first and second rearward pivotable support connectors mounted on said exterior surface of said containment tub adjacent said rear wall;

said first and second forward and rearward pivotable support connectors each including a generally horizontal pin rotatably mounted on said containment tub and a sleeve rotatably mounted on said pin;

said first and second forward and rearward tub supports each including a generally concave saddle portion adapted to receive a respective one of said sleeves of said first and second forward pivotable support connectors and said first and second rearward pivotable support connectors therein;

said containment tub being pivotably mounted on said wheeled frame by releasable connection of each of said first and second forward pivotable support connectors to a respective one of said first and second forward tub supports, and releasable connection of each of said first and second rearward pivotable support connectors to a respective one of said first and second rearward tub supports, said pin and said sleeve of said first and second forward and rearward pivotable support connectors operating such that upon said sleeve being seated in one of said generally concave saddle portions, said pin rotates within said sleeve and said pin is rotatable relative to said containment tub;

first and second forward releasable locking means each mounted adjacent a respective one of said first and second forward tub supports and first and second rearward locking means each mounted adjacent a respective one of said first and second rearward tub supports for releasably securing said first and second forward and rearward pivotable support connectors to a respective one of said forward and rearward tub supports;

a lifting system mounted on said wheeled frame intermediate said forward and rearward ends, said lifting system including at least one power cylinder connected at one end thereof to said wheeled frame and at the opposite end thereof to said containment tub; and means for engaging said at least one power cylinder whereby said containment tub will pivot about said first forward and rearward pivotable support connectors when said first forward and rearward pivotable support connectors are secured within said first forward and rearward tub supports by said first forward and rearward locking means, and said containment tub will pivot about said second forward and rearward pivotable support connectors when said second forward and rearward pivotable support connectors are secured within said second forward and rearward tub supports by said second forward and rearward locking means, said sleeves of said respective first and second forward and rearward pivotable support connectors being generally non-rotatably secured within a respective one of said first and second forward and rearward tub supports, said pins of said respective first and second forward and rearward pivotable support connectors rotating within said sleeves whereby said containment tub is easily pivoted.

2. The bidirectional side dump trailer of claim 1 wherein said wheeled frame comprises two I-beam main frame support members extending generally parallel with each other in spaced-apart relation, said support members secured in spaced-apart relation by forward and rearward tub support beams each extending generally parallel with one another and generally perpendicular to said support members, said forward tub support beam adapted to support said first and second forward tub supports and said rearward tub support beam adapted to support said first and second rearward tub supports and thereby support said containment tub on said wheeled frame.

3. The bidirectional side dump trailer of claim 2 wherein said first and second forward and rearward pivotable support connectors each further comprise a pair of generally parallel upright pin support plates mounted on said containment tub, each of said pin support plates including a cylindrical bushing extending transversely through said pin support plates.

4. The bidirectional side dump trailer of claim 3 wherein each of said generally horizontal pins of said first and second forward and rearward pivotable support connectors is a tub support pin, extending between and threaded through said cylindrical bushings on said pin support plates, having an external diameter which is smaller than the internal diameter of said cylindrical bushings whereby said pin may freely rotate within said cylindrical bushings, and each of said sleeves of said first and second forward and rearward pivotable support connectors being freely rotatably mounted surrounding said pin thereby also permitting said pin to rotate freely within said sleeve whereby friction and wear caused by engagement of metal surfaces is greatly reduced.

5. The bidirectional side dump trailer of claim 2 wherein said frame further comprises a lifting system well mounted on and between said I-beam main frame support members intermediate said forward and rearward tub support beams, said well including a rectangular base wall extending generally horizontally for mounting said lifting system thereon.

6. The bidirectional side dump trailer of claim 5 wherein said at least one power cylinder comprises a hydraulic cylinder having opposite ends, each of said ends including a cylindrical connection sleeve for pivotably mounting said at least one power cylinder.

7. The bidirectional side dump trailer of claim 1 wherein said first and second forward and rearward tub supports each further comprise an upwardly extending, generally pyramidal-shaped metal saddle mounted on a respective one of said first and second forward and rearward tub supports, each said metal saddle including said generally concave saddle portion formed on an upper surface of said metal saddle.

8. The bidirectional side dump trailer of claim 1 wherein said containment tub further comprises at least one circumferential reinforcement band mounted on said tub, said band connected to said front wall, said rear wall and said side walls and extending around said containment tub such that said walls are reinforced by said circumferential reinforcement band.

9. The bidirectional side dump trailer of claim 1 wherein said first and second forward and rearward releasable locking means each comprise a hydraulic sleeve securement mechanism including sleeve-engaging hooks pivotably mounted adjacent said generally concave saddle portion, said hooks operative to pivot over and above said sleeves when said sleeves are held within said generally concave saddle portions and at least partially engage said sleeves thereby releasably securing said sleeves within said generally concave saddle portions.

10. The bidirectional side dump trailer of claim 9 further comprising locking device control means operatively connected to each of said hydraulic sleeve securement mechanisms for pivoting said sleeve-engaging hooks between a sleeve securement position and a sleeve release position, whereby said containment tub may be dumped to one side or the other of said wheeled frame by securing said first forward and rearward pivotable support connectors thereby dumping said containment tub about a pivot axis defined by said first forward and rearward pivotable support connectors, and securing said second forward and rearward pivotable support connectors whereby said containment tub will pivot about said second forward and rearward pivotable support connectors.

11. The bidirectional side dump trailer of claim 1 wherein said containment tub further comprises a central tub reinforcement structure mounted within said containment tub, said central tub reinforcement structure having a generally inverted V-shaped cross-sectional shape including front and rear walls angled upwards and inwards and connecting to one another forming a top, said walls mounted on said base wall and said side walls, said top of said central tub reinforcement structure extending upwards to a point below the top of said containment tub whereby said containment tub may carry long objects such as trees and poles.

12. A bidirectional side dump trailer comprising:

a wheeled frame having a forward end, a rearward end and opposite sides;

first and second forward tub supports mounted on said wheeled frame adjacent said forward end of said wheeled frame, said first forward tub support adjacent one side of said wheeled frame and said second forward tub support adjacent the other side of said wheeled frame;

first and second rearward tub supports mounted on said wheeled frame adjacent said rearward end of said wheeled frame, said first rearward tub support adjacent one side of said wheeled frame and said second rearward tub support adjacent the other side of said wheeled frame;

a containment tub including a base wall, at least two side walls, a front wall and a rear wall thereby defining an open-topped containment tub having exterior and interior surfaces;

first and second forward pivotable support connectors mounted on said exterior surface of said containment tub adjacent said front wall;

first and second rearward pivotable support connectors mounted on said exterior surface of said containment tub adjacent said rear wall;

said first and second forward and rearward pivotable support connectors each including a generally horizontal pin rotatably mounted on said containment tub and a sleeve rotatably mounted on said pin;

said first and second forward and rearward tub supports each including a generally concave saddle portion adapted to receive a respective one of said sleeves of said first and second forward pivotable support connectors and said first and second rearward pivotable support connectors therein;

said containment tub being pivotably mounted on said wheeled frame by releasable connection of each of said first and second forward pivotable support connectors to a respective one of said first and second forward tub supports, and releasable connection of each of said first and second rearward pivotable support connectors to a respective one of said first and second rearward tub supports, said pin and said sleeve of said first and second forward and rearward pivotable support connectors operating such that upon said sleeve being seated in one of said generally concave saddle portions, said sleeve remains in a generally non-rotating position while said pin rotates within said sleeve;

first and second forward releasable locking means each mounted adjacent a respective one of said first and second forward tub supports and first and second rearward locking means each mounted adjacent a respective one of said first and second rearward tub supports for releasably securing said first and second forward and rearward pivotable support connectors to a respective one of said forward and rearward tub supports;

a lifting system mounted on said wheeled frame underneath said containment tub when said containment tub is mounted on said wheeled frame, said lifting system including at least one power cylinder connected at one end thereof to said wheeled frame and at the opposite end thereof to said base wall of said containment tub; and means for engaging said at least one power cylinder whereby said containment tub will pivot about said first forward and rearward pivotable support connectors when said first forward and rearward pivotable support connectors are secured within said first forward and rearward tub supports by said first forward and rearward locking means, and said containment tub will pivot about said second forward and rearward pivotable support connectors when said second forward and rearward pivotable support connectors are secured within said second forward and rearward tub supports by said second forward and rearward locking means, said sleeves of said respective first and second forward and rearward pivotable support connectors being generally secured within a respective one of said first and second forward and rearward tub supports, said pins of said respective first and second forward and rearward pivotable support connectors rotating within said sleeves whereby said containment tub is easily pivoted.

13. A bidirectional side dump trailer comprising:

a frame having a forward end, a rearward end and opposite sides;

first and second forward tub supports mounted on said frame adjacent said forward end of said frame, said first forward tub support adjacent one side of said frame and said second forward tub support adjacent the other side of said frame;

first and second rearward tub supports mounted on said frame adjacent said rearward end of said frame, said first rearward tub support adjacent one side of said frame and said second rearward tub support adjacent the other side of said frame;

first and second center tub supports mounted on said frame intermediate said forward tub supports and said rearward tub supports, said first center tub support adjacent one side of said frame and said second center tub support adjacent the other side of said frame;

a containment tub including a base wall, at least two side walls, a front wall and a rear wall thereby defining an open-topped containment tub having exterior and interior surfaces and an interior volume, said containment tub being generally free of reinforcement structures within said interior volume;

first and second forward, center and rearward pivotable support connectors mounted on said exterior surface of said containment tub, said forward pivotable support connectors mounted adjacent said front wall, said rearward pivotable support connectors mounted adjacent said rear wall and said center pivotable support connectors mounted intermediate said forward pivotable support connectors and said rearward pivotable support connectors;

said first and second forward, center and rearward pivotable support connectors each including a generally horizontal pin rotatably mounted on said containment tub and a sleeve rotatably mounted on said pin;

said first and second forward and rearward tub supports each including a generally concave saddle portion adapted to receive a respective one of said sleeves of said first and second forward pivotable support connectors and said first and second rearward pivotable support connectors therein;

said containment tub being pivotably mounted on said frame by releasable connection of each of said first and second forward pivotable support connectors to a respective one of said first and second forward tub supports, releasable connection of each of said first and second rearward pivotable support connectors to a respective one of said first and second rearward tub supports and releasable connection of each of said first and second center pivotable support connectors to a respective one of said first and second center tub supports, said pin and said sleeve of said first and second forward, center and rearward pivotable support connectors operating such that upon said sleeve being seated in one of said generally concave saddle portions, said pin rotates within said sleeve and said pin is rotatable relative to said containment tub;

first and second forward releasable locking means each mounted adjacent a respective one of said first and second forward tub supports, first and second rearward locking means each mounted adjacent a respective one of said first and second rearward tub supports and first and second center locking means each mounted adjacent a respective one of said first and second center tub supports for releasably securing said first and second forward, center and rearward pivotable support connectors to a respective one of said forward, center and rearward tub supports;

a lifting system mounted on said frame intermediate said forward and rearward ends, said lifting system including at least one power cylinder connected at one end thereof to said frame and at the opposite end thereof to said containment tub; and means for engaging said at least one power cylinder whereby said containment tub will pivot about said first forward, center and rearward pivotable support connectors when said first forward, center and rearward pivotable support connectors are secured within said first forward, center and rearward tub supports by said first forward, center and rearward locking means, and said containment tub will pivot about said second forward, center and rearward pivotable support connectors when said second forward, center and rearward pivotable support connectors are secured within said second forward, center and rearward tub supports by said second forward, center and rearward locking means, said sleeves of said respective first and second forward, center and rearward pivotable support connectors being generally non-rotatably secured within a respective one of said first and second forward, center and rearward tub supports, said pins of said respective first and second forward, center and rearward pivotable support connectors rotating within said sleeves whereby said containment tub is easily pivoted.

14. A bidirectional side dump trailer comprising:

a frame having a forward end, a rearward end and opposite sides;

first and second forward tub supports mounted on said frame adjacent said forward end of said frame, said first forward tub support adjacent one side of said frame and said second forward tub support adjacent the other side of said frame;

first and second rearward tub supports mounted on said frame adjacent said rearward end of said frame, said first rearward tub support adjacent one side of said frame and said second rearward tub support adjacent the other side of said frame;

a containment tub including a base wall, at least two side walls, a front wall and a rear wall thereby defining an open-topped containment tub having exterior and interior surfaces and an interior volume, said containment tub being generally free of reinforcement structures within said interior volume;

first and second forward and rearward pivotable support connectors mounted on said exterior surface of said containment tub, said forward pivotable support connectors mounted adjacent said front wall and said rearward pivotable support connectors mounted adjacent said rear wall;

said first and second forward and rearward pivotable support connectors each including a generally horizontal pin rotatably mounted on said containment tub and a sleeve rotatably mounted on said pin;

said first and second forward and rearward tub supports each including a generally concave saddle portion adapted to receive a respective one of said sleeves of said first and second forward pivotable support connectors and said first and second rearward pivotable support connectors therein;

said containment tub being pivotably mounted on said frame by releasable connection of each of said first and second forward pivotable support connectors to a respective one of said first and second forward tub supports and releasable connection of each of said first and second rearward pivotable support connectors to a respective one of said first and second rearward tub supports, said pin and said sleeve of said first and second forward and rearward pivotable support connectors operating such that upon said sleeve being seated in one of said generally concave saddle portions, said pin rotates within said sleeve and said pin is rotatable relative to said containment tub;

first and second forward releasable locking means each mounted adjacent a respective one of said first and second forward tub supports and first and second rearward locking means each mounted adjacent a respective one of said first and second rearward tub supports for releasably securing said first and second forward and rearward pivotable support connectors to a respective one of said forward and rearward tub supports;

a lifting system mounted on said frame intermediate said forward and rearward ends, said lifting system including at least two power cylinders connected at one end thereof to said frame and at the opposite end thereof to said containment tub, one of said power cylinders positioned adjacent said front wall of said tub and another of said power cylinders positioned adjacent said rear wall of said tub; and means for engaging said at least two power cylinders whereby said containment tub will pivot about said first forward and rearward pivotable support connectors when said first forward and rearward pivotable support connectors are secured within said first forward and rearward tub supports by said first forward and rearward locking means, and said containment tub will pivot about said second forward and rearward pivotable support connectors when said second forward and rearward pivotable support connectors are secured within said second forward and rearward tub supports by said second forward and rearward locking means, said sleeves of said respective first and second forward and rearward pivotable support connectors being generally non-rotatably secured within a respective one of said first and second forward and rearward tub supports, said pins of said respective first and second forward and rearward pivotable support connectors rotating within said sleeves whereby said containment tub is easily pivoted.

* * * * *